United States Patent
Hunt et al.

(10) Patent No.: US 10,102,096 B2
(45) Date of Patent: Oct. 16, 2018

(54) METHOD AND APPARATUS FOR GPS BASED Z-AXIS DIFFERENCE PARAMETER COMPUTATION

(71) Applicant: ZONAR SYSTEMS, INC., Seattle, WA (US)

(72) Inventors: Bryan Hunt, Spokane, WA (US); Charles Michael McQuade, Issaquah, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 0 days.

(21) Appl. No.: 15/200,912

(22) Filed: Jul. 1, 2016

(65) Prior Publication Data

US 2016/0311441 A1    Oct. 27, 2016

Related U.S. Application Data

(63) Continuation of application No. 13/719,208, filed on Dec. 18, 2012, now Pat. No. 9,384,111.
(Continued)

(51) Int. Cl.
*G06F 11/30* (2006.01)
*G09B 19/16* (2006.01)
(Continued)

(52) U.S. Cl.
CPC ......... *G06F 11/3065* (2013.01); *B60W 40/09* (2013.01); *G05B 15/02* (2013.01);
(Continued)

(58) Field of Classification Search
CPC ........ G09B 19/167; G09B 9/04; G09B 9/052; G09B 19/16
(Continued)

(56) References Cited

U.S. PATENT DOCUMENTS 3,990,067 A   11/1976   Van Dusen et al.
4,025,791 A   5/1977   Lennington et al.
(Continued)

FOREIGN PATENT DOCUMENTS

CA   2138378   11/1994
CA   2326892   10/1999
(Continued)

OTHER PUBLICATIONS

"The PenMaster" and "The PSION Workabout." Copyright 2000 GCS General Control Systems. <http://www.gcs.at/eng/produkte/hw/penmaster.htm>.
(Continued)

*Primary Examiner* — Jerry Fletcher

(57) ABSTRACT

Data is collected during the operation of a vehicle and used to produce a ranking of a driver's efficiency performance, and that ranking is shared on a hosted website, such that the drivers can compare their performance metrics to their peers. Fleet operators can use these performance metrics as incentives, by linking driver pay with efficiency performance. Individual fleet operators can host their own website, where driver rankings in that fleet can be compared, or the website can be hosted by a third party, and multiple fleet operators participate. The third party can offset their costs for operating the website by charging participating fleet operators a fee, and/or by advertising revenue. In some embodiments, all driver efficiency performance data is displayed in an anonymous format, so that individual drivers cannot be identified unless the driver shares their user ID.

19 Claims, 15 Drawing Sheets

Related U.S. Application Data

(60) Provisional application No. 61/580,190, filed on Dec. 23, 2011.

(51) Int. Cl.

| | | |
|---|---|---|
| *G06F 17/00* | (2006.01) | |
| *B60W 40/09* | (2012.01) | |
| *G06Q 10/06* | (2012.01) | |
| *G05B 15/02* | (2006.01) | |
| *G06F 17/11* | (2006.01) | |

(52) U.S. Cl.
CPC ......... *G06F 11/3024* (2013.01); *G06F 17/00* (2013.01); *G06F 17/11* (2013.01); *G06Q 10/06398* (2013.01); *G09B 19/167* (2013.01); *B60W 2510/0638* (2013.01); *B60W 2510/0657* (2013.01); *B60W 2520/10* (2013.01); *B60W 2550/142* (2013.01); *B60W 2550/40* (2013.01); *B60W 2550/402* (2013.01)

(58) Field of Classification Search
USPC ........................................ 434/29, 62, 64–65
See application file for complete search history.

(56) References Cited

U.S. PATENT DOCUMENTS

| | | |
|---|---|---|
| 4,258,521 A | 3/1981 | Juhasz et al. |
| 4,325,057 A | 4/1982 | Bishop |
| 4,602,127 A | 7/1986 | Neely et al. |
| 4,688,244 A | 8/1987 | Hannon et al. |
| 4,750,197 A | 7/1988 | Denekamp et al. |
| 4,763,356 A | 8/1988 | Day, Jr. et al. |
| 4,799,162 A | 1/1989 | Shinakawa et al. |
| 4,897,792 A | 1/1990 | Hosoi |
| 5,058,044 A | 10/1991 | Stewart et al. |
| 5,068,656 A | 11/1991 | Sutherland |
| 5,128,651 A | 7/1992 | Heckart |
| 5,206,643 A | 4/1993 | Eckelt |
| 5,223,844 A | 6/1993 | Mansell et al. |
| 5,243,343 A | 9/1993 | Rogers |
| 5,321,629 A | 6/1994 | Shirata et al. |
| 5,394,136 A | 2/1995 | Lammers et al. |
| 5,399,844 A | 3/1995 | Holland |
| 5,459,304 A | 10/1995 | Eisenmann |
| 5,459,660 A | 10/1995 | Berra |
| 5,499,182 A | 3/1996 | Ousborne |
| 5,541,845 A | 7/1996 | Klein |
| 5,546,305 A | 8/1996 | Kondo |
| 5,557,254 A | 9/1996 | Johnson et al. |
| 5,557,628 A | 9/1996 | Hughes et al. |
| 5,572,192 A | 11/1996 | Berube |
| 5,585,552 A | 12/1996 | Heuston et al. |
| 5,600,323 A | 2/1997 | Boschini |
| 5,610,596 A | 3/1997 | Petitclerc |
| 5,629,678 A | 5/1997 | Gargano et al. |
| 5,671,158 A | 9/1997 | Fournier et al. |
| 5,680,328 A | 10/1997 | Skorupski et al. |
| 5,719,771 A | 2/1998 | Buck et al. |
| 5,731,893 A | 3/1998 | Dominique |
| 5,754,965 A | 5/1998 | Hagenbuch |
| 5,758,299 A | 5/1998 | Sandborg et al. |
| 5,768,382 A | 6/1998 | Schneier et al. |
| 5,804,937 A | 9/1998 | Sasajima et al. |
| 5,808,565 A | 9/1998 | Matta et al. |
| 5,839,112 A | 11/1998 | Schreitmueller et al. |
| 5,874,891 A | 2/1999 | Lowe |
| 5,942,753 A | 8/1999 | Dell |
| 5,995,898 A | 11/1999 | Tuttle |
| 6,043,661 A | 3/2000 | Gutierez |
| 6,049,755 A | 4/2000 | Lou et al. |
| 6,054,950 A | 4/2000 | Fontana |
| 6,078,255 A | 6/2000 | Dividock et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,128,959 A | 10/2000 | McGovern et al. |
| 6,169,943 B1 | 1/2001 | Simon et al. |
| 6,236,911 B1 | 5/2001 | Kruger |
| 6,253,129 B1 | 6/2001 | Jenkins |
| 6,256,579 B1 | 7/2001 | Tanimoto |
| 6,263,273 B1 | 7/2001 | Henneken et al. |
| 6,278,928 B1 | 8/2001 | Aruga et al. |
| 6,370,454 B1 | 4/2002 | Moore |
| 6,374,176 B1 | 4/2002 | Schmier et al. |
| 6,396,413 B2 | 5/2002 | Hines et al. |
| 6,411,891 B1 | 6/2002 | Schick et al. |
| 6,438,472 B1 | 8/2002 | Tano et al. |
| 6,450,411 B1 | 9/2002 | Rash et al. |
| 6,456,039 B1 | 9/2002 | Lauper et al. |
| 6,505,106 B1 | 1/2003 | Lawrence |
| 6,529,808 B1 | 3/2003 | Diem |
| 6,539,296 B2 | 3/2003 | Diaz et al. |
| 6,594,621 B1 | 6/2003 | Meeker |
| 6,597,973 B1 | 7/2003 | Barich et al. |
| 6,614,392 B2 | 9/2003 | Howard |
| 6,664,897 B2 | 12/2003 | Pape et al. |
| 6,671,646 B2 | 12/2003 | Manegold et al. |
| 6,708,113 B1 | 3/2004 | Von Gerlach et al. |
| 6,735,542 B1 | 5/2004 | Burgett et al. |
| 6,801,901 B1 | 10/2004 | Ng |
| 6,804,626 B2 | 10/2004 | Manegold et al. |
| 6,834,259 B1 | 12/2004 | Markwitz et al. |
| 6,847,887 B1 | 1/2005 | Casino |
| 6,856,897 B1 | 2/2005 | Phuyal |
| 6,894,617 B2 | 5/2005 | Richman |
| 6,909,947 B2 | 7/2005 | Douros et al. |
| 7,027,955 B2 | 4/2006 | Markwitz et al. |
| 7,035,733 B1 | 4/2006 | Alwar et al. |
| 7,048,185 B2 | 5/2006 | Hart et al. |
| 7,103,460 B1 | 9/2006 | Breed |
| 7,174,243 B1 | 2/2007 | Lightner et al. |
| 7,174,277 B2 | 2/2007 | Vock et al. |
| 7,184,866 B2 | 2/2007 | Squires et al. |
| 7,254,516 B2 | 8/2007 | Case, Jr. et al. |
| 7,424,414 B2 | 9/2008 | Craft |
| 7,692,552 B2 | 4/2010 | Harrington et al. |
| 8,577,703 B2 | 11/2013 | McClellan et al. |
| 8,604,920 B2 | 12/2013 | Armitage et al. |
| 8,849,501 B2 | 9/2014 | Cook et al. |
| 8,918,229 B2 | 12/2014 | Hunt |
| 8,930,040 B2 | 1/2015 | Gompert et al. |
| 8,996,287 B2 | 3/2015 | Davidson et al. |
| 2001/0047283 A1 | 11/2001 | Melick et al. |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0022984 A1 | 2/2002 | Daniel et al. |
| 2002/0065698 A1 | 5/2002 | Schick et al. |
| 2002/0107833 A1 | 8/2002 | Kerkinni |
| 2002/0107873 A1 | 8/2002 | Winkler et al. |
| 2002/0111725 A1 | 8/2002 | Burge |
| 2002/0116122 A1 | 8/2002 | Satonaka |
| 2002/0122583 A1 | 9/2002 | Thompson |
| 2002/0133273 A1 | 9/2002 | Lowrey et al. |
| 2002/0133275 A1 | 9/2002 | Thibault |
| 2002/0147610 A1 | 10/2002 | Tabe |
| 2002/0150050 A1 | 10/2002 | Nathanson |
| 2002/0156558 A1 | 10/2002 | Hanson et al. |
| 2002/0163449 A1 | 11/2002 | Flick |
| 2002/0165669 A1 | 11/2002 | Pinto et al. |
| 2002/0178147 A1 | 11/2002 | Arroyo et al. |
| 2002/0188593 A1 | 12/2002 | Moser et al. |
| 2003/0030550 A1 | 2/2003 | Talbot |
| 2003/0033061 A1 | 2/2003 | Chen et al. |
| 2003/0033071 A1 | 2/2003 | Kawasaki |
| 2003/0109973 A1 | 6/2003 | Hensey et al. |
| 2003/0120745 A1 | 6/2003 | Katagishi et al. |
| 2003/0182033 A1 | 9/2003 | Underdahl |
| 2004/0009819 A1 | 1/2004 | Koga |
| 2004/0054470 A1 | 3/2004 | Farine et al. |
| 2004/0236596 A1 | 11/2004 | Chowdhary et al. |
| 2004/0243368 A1 | 12/2004 | Hierner et al. |
| 2005/0107946 A1 | 5/2005 | Shimizu |

(56) References Cited

U.S. PATENT DOCUMENTS

| | | |
|---|---|---|
| 2005/0209775 A1 | 9/2005 | Entenmann |
| 2005/0273250 A1 | 12/2005 | Hamilton et al. |
| 2007/0001831 A1 | 1/2007 | Raz et al. |
| 2007/0083314 A1 | 4/2007 | Corigliano |
| 2007/0156337 A1 | 7/2007 | Yanni |
| 2007/0179709 A1 | 8/2007 | Doyle |
| 2008/0154489 A1 | 6/2008 | Kaneda et al. |
| 2008/0154712 A1 | 6/2008 | Wellman |
| 2008/0243389 A1 | 10/2008 | Inoue |
| 2008/0262646 A1 | 10/2008 | Breed |
| 2008/0319602 A1 | 12/2008 | McClellan et al. |
| 2009/0143923 A1 | 6/2009 | Breed |
| 2009/0156310 A1 | 6/2009 | Fargo |
| 2009/0186325 A1 | 7/2009 | Kumar |
| 2010/0160013 A1 | 6/2010 | Sanders |
| 2010/0209884 A1 | 8/2010 | Lin et al. |
| 2010/0209890 A1 | 8/2010 | Huang et al. |
| 2010/0209891 A1 | 8/2010 | Lin et al. |
| 2010/0211278 A1 | 8/2010 | Craig |
| 2011/0112739 A1 | 5/2011 | O'Dea |
| 2011/0148618 A1 | 6/2011 | Harumoto et al. |
| 2011/0161116 A1 | 6/2011 | Peak et al. |
| 2012/0256770 A1 | 10/2012 | Mitchell |
| 2013/0046559 A1 | 2/2013 | Coleman et al. |
| 2013/0164712 A1 | 6/2013 | Hunt et al. |
| 2013/0164713 A1 | 6/2013 | Hunt et al. |
| 2013/0164715 A1 | 6/2013 | Hunt et al. |
| 2013/0166170 A1 | 6/2013 | Hunt et al. |
| 2013/0184965 A1 | 7/2013 | Hunt et al. |
| 2013/0209968 A1 | 8/2013 | Miller |
| 2013/0274955 A1 | 10/2013 | Rosenbaum |
| 2013/0345927 A1 | 12/2013 | Cook et al. |
| 2014/0257943 A1 | 9/2014 | Nerayoff et al. |
| 2014/0309849 A1 | 10/2014 | Ricci |
| 2014/0350777 A1 | 11/2014 | Kawai et al. |
| 2014/0365070 A1 | 12/2014 | Yano et al. |
| 2015/0291176 A1 | 10/2015 | Jeong |

FOREIGN PATENT DOCUMENTS

| | | |
|---|---|---|
| CA | 2388572 T1 | 5/2001 |
| EP | 2116968 A1 | 11/2009 |
| JP | 280985 A | 10/2001 |
| JP | 2001280985 A | 10/2001 |
| WO | 023550 | 3/2003 |

OTHER PUBLICATIONS

Tiscor: Inspection Manager 6.0 User Guide. USA; 2004.1-73.

"D. 0. T. Driver Vehicle Inspection Reports on your wireless phone!" FleeTTrakkeR LLC 2002-2003 FleeTTrakkeR LLC . All rights reserved <http://www.fleettrakker.com/web/index.jsp>.

"Detex Announces the Latest Innovation in Guard Tour Verification Technology." DETEX Life Safety, Security and Security Assurance. Jan. 1, 2003. 1pp. © 2002-2004 Detex Corporation. <http://www.detex.com/NewsAction.jspa?id=3>.

"Nextel, Motorola and Symbol Technologies Offer First Wireless Bar Code Scanner for Mobile Phones." InvoiceDealers.

"The Data Acquisition Unit Escorte." The Proxi Escort.com. Nov. 20, 2001. 4pp. © 2000 GCS General Control Systems. <http://www.gcs.at/eng/produkte/hw/escorte.htm>.

"Tracking out of route: software helps fleets compare planned routes to actual miles. (Technology)." Commercial Carrier Journal. Published Oct. 1, 2005. 4pp. NDN-219-1054-1717-0.

"What is the Child Check-Mate Safety System?" 2002@Child Checkmate Systems, Inc. <http://www.childcheckmate.comlwhat.html>.

Albright, Brian: "Indiana Embarks on Ambitious RFID roll out." Frontline Solutions. May 20, 2002; 2pp. Available at: <http://www.frontlinetoday.comlfrontline/article/articleDetail.jsp?id=19358>.

Anonymous. "Transit agency builds GIS to plan bus routes." American City & County. vol. 118, No. 4. Published Apr. 1, 2003. pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

Dwyer, B.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." INCONTEXT Indiana;s Workforce and Economy. Jan.-Feb. 2003 vol. 4, No. 5pp. Available at <http://www.incontext.indiana.edu/2003/janfeb03/governement.html>.

Quaan et al., "Guard Tour Systems." Security Management Online. Sep. 16, 2003. 1pg. © 2000 Available at: <http://www.securitymanagement.comiubb/Forum30/HTMLI000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving A Niche Beyond Asset Tracking." Business Solutions. Feb. 1999: 5pp. Available at: <http://www.businesssolutionsmag.comiArticles/1999_02/990208.htm>.

Tiscor: The Mobile Software Solutions Provider. Inspection Manager: An Introduction and Slide Presentation; 19pp. Available: <www/TOSCOR.com>.

Tsakiri, M et al. Abstract: "Urban fleet monitoring with GPS and GLONASS." Journal ofNavigation, vol. 51, No. 3. Published Sep. 1998. 2pp. NDN-174-0609-4097-3.

Tuttle, John R. "Digital RF/ID Enhances GPS" Proceedings of the Second Annual Wireless Symposium, pp. 406-411, Feb. 15-18, 1994, Santa Clara, CA.

Want, Roy, "RFID A Key to Automating Everything." Scientific American (Jan. 2004): 58-65.

METHOD AND APPARATUS FOR GPS BASED Z-AXIS DIFFERENCE PARAMETER COMPUTATION

This application is a continuation of application, Ser. No. 13/719,208 filed on Dec. 18, 2012, now U.S. Pat. No. 9,384,111, issuing on Jul. 5, 2016, which is based on provisional application Ser. No. 61/580,190, filed on Dec. 23, 2011, the benefit of the filing date of which is hereby claimed under 35 U.S.C. § 119(e).

BACKGROUND

As the cost of sensors, communications systems and navigational systems has dropped, operators of commercial and fleet vehicles now have the ability to collect a tremendous amount of data about the vehicles that they operate, including how the vehicles are being driven by the drivers operating such vehicles.

Unfortunately, simply collecting such data does not automatically translate into cost savings. It would be desirable to provide such fleet operators with additional tools in order to derive a benefit from the wealth of data that can be collected. Preferably, such tools can be used to provide feedback to drivers to enable the fleet operator to encourage driving habits leading to cost savings. Such a tool might thus be used to develop objective criteria that could be used encourage and provide incentives to drivers to improve their performance in operating the vehicles in a fleet.

SUMMARY

One aspect of the novel concepts presented herein is a method of producing a numerical ranking of a driver's performance based on a plurality of metrics (recognizing that the concepts disclosed herein also encompass the use of only a single metric), and then sharing those metrics on a hosted website, such that the drivers can compare their performance metrics to those of their peers. Fleet operators can use these performance metrics as incentives, by linking driver pay with performance. Such a method comprises the steps of automatically collecting a plurality of metrics while a driver is operating a vehicle, automatically determining a numerical value for each metric, automatically combining the numerical values for the plurality of metrics to achieve a numerical performance value, and normalizing the numerical performance value to achieve a numerical ranking of the driver's performance while operating a vehicle, and then posting the driver performance data to the hosted website.

In at least one related embodiment, fleet operators will pay drivers using a mileage component (i.e., paying drivers a fixed rate per loaded mile), while also making additional payments to drivers meeting predefined performance characteristics. In at least one related embodiment, only drivers having top ranking performance metrics (such as drivers having performance scores in the top 10% of the fleet, or the 25 drivers having the best performance scores in the fleet, recognizing that such specific examples are not intended to be limiting) will be eligible for the performance pay. In at least one other related embodiment, any driver in the fleet will be eligible for performance bonus pay once they have met a predefined performance metric.

While many embodiments will employ a single normalized numerical performance score (i.e., a numerical score that combines several different metrics together), it should be recognized that in some embodiments performance pay can be linked to specific performance metrics. For example, consider a fleet operator who has many routes involving mountainous terrain, and that fleet is experiencing excessing brake wear/failure over those routes. That operator may want to link performance pay to brake operating temperature for a period of time to induce drivers operating over those routes to pay more attention to brake temperature. Such a focused review of driver performance data for a defined period of time will be referred to herein and in the claims that follow as a campaign. Where a campaign emphasizes a performance metric such as brake temperature, the campaign can be designed to score drivers' performance in that campaign based only on the target metric (or metrics), such as brake temperature, or an existing normalized performance score can be modified so that the target metric (in this case, brake temperature) is more heavily weighted than normal.

It should be recognized that campaigns can be metric specific, or can be based on a single normalized score, but will generally share in common the characteristic of being implemented for a defined period of time. Drivers will learn to associate such campaigns with opportunities to increase their pay by meeting the performance goals of individual campaigns. In some embodiments, campaign participants are limited to drivers in a specific fleet (i.e., an intra-company or intra-fleet campaign). In such embodiments, that fleet generally will be paying the performance bonuses for the campaign. In other embodiments, campaign participants are not limited to drivers in only one specific fleet (i.e., an inter-company or inter-fleet campaign). In such an embodiment, a third party may be paying the performance bonuses for the campaign. For example, companies providing goods and services to the trucking or vehicle transportation industry may sponsor such a campaign for advertising purposes. A particular fleet operator seeking to attract the attention of drivers in other fleets might also be a sponsor of an inter-company campaign.

In at least one aspect of the concepts disclosed herein, the performance metric is designed to facilitate comparison of driver performance data across different fleets, and different vehicles. This will enable individual campaigns to include more participating drivers, which in turn will bring in more advertising revenue to fund bigger performance bonuses. In at least one embodiment, such a metric is mutually agreed upon by a plurality of different fleet operators. Adoption of a common performance metric across multiple fleets will enable top performing drivers to be able to show their cumulative performance scores to other participating fleet operators, providing an additional tool for fleets to use when evaluating potential new hires. Such a common performance metric will also enable participating fleet operators to appear more attractive as potential employers than non-participating fleet operators, who will not be offering the drivers the potential of earning the additional performance based income (i.e., income in addition to the industry standard pay by the mile driver compensation).

The concepts disclosed herein encompass embodiments in which individual fleet operators host their own website, where driver rankings in that fleet can be compared. In other embodiments, the website is hosted by a third party, and multiple fleet operators participate. The third party can offset their costs for operating the website by charging participating fleet operators a fee, and/or by advertising revenue. In some embodiments, all driver performance data is displayed in an anonymous format, so that individual drivers cannot be identified unless the driver shares their user ID. In some embodiments, drivers can only compare their score with drivers in their own fleet, while in other embodiments drivers can see the performance data of drivers in other fleets.

Having described the social networking/performance pay aspect of the concepts disclosed herein, the following is directed to discussing exemplary techniques that can be used to acquire the performance data. However, it should be recognized that the social networking/performance pay concepts disclosed herein can be implemented using driver performance metrics generated using different techniques, including techniques that do and do not rely on real-time transmission of performance data from participating vehicles to a remote data center. At least some of the concepts disclosed herein can be implanted using data recorders that store data for a period of time before conveying that data to a data center for generating the driver performance data.

In at least one embodiment, the performance metric is based at least in part from data collected from one or more engine control units (or vehicle computer(s)) in a vehicle operated by the driver whose performance is being measured.

In at least one embodiment, the performance metric is based at least in part on fuel economy.

In at least one embodiment, the performance metric is based at least in part on carbon footprint reduction.

In at least one embodiment, the performance metric is based at least in part on minimizing fuel efficiency robbing behavior, including sudden braking, rapid acceleration and downshifting too early.

In at least one embodiment, the performance metric is based at least in part on maximizing fuel efficiency enhancing behavior, including coasting to a stop (instead of staying on the accelerator until the last minute and then braking hard), driving at high average vehicle speeds with minimum time spent at maximum vehicle speed, driving in such a manner so as to achieve a high percent trip distance in top gear (90+% recommended), driving in such a manner so as to achieve a high percent distance in cruise control, driving in such a manner so as to achieve a minimum percent idle/PTO operation, driving in such a manner so as to achieve a minimum service brake activity, driving in such a manner so as to achieve a relatively low number of sudden decelerations, and driving in such a manner so as to achieve a relatively low number of service brake actuations/1000 miles.

In at least one embodiment, the commonly adopted performance metric is based on the amount of vehicle work performed. In at least one embodiment, such a metric includes using vehicle position derived slope data to determine a vehicle's mass at a plurality of different times during the operation of a vehicle, and then using the mass to calculate work. The vehicle position data is generated by a position sensing system including a component (such as a receiver) disposed in the vehicle. An exemplary position sensing system is the Global Positioning System (GPS). The GPS system is a space-based satellite navigation system that provides location and time information in all weather, anywhere on or near the Earth, where there is an unobstructed line of sight to four or more GPS satellites. It is maintained by the United States government and is freely accessible to anyone with a GPS receiver. It should be understood that when the term GPS is used herein and the claims that follow to refer to a component located at a vehicle, that such a component is a receiver for receiving satellite signals from the GPS system. Further, it should be understood that the concepts disclosed herein can be implemented using different types of vehicle position sensing systems, such as the Russian Global Navigation Satellite System (GLONASS), the planned European Union Galileo positioning system, the Chinese Compass navigation system, and the Indian Regional Navigational Satellite System, and similar such systems as they are developed. The concepts disclosed herein can also be implemented by relying on basic triangulation of signals received from terrestrial based transmitters (such as cell towers), should sufficient transmitters be available (and should the vehicle position resolution obtainable using such technology be generally comparable with that available from satellite based systems).

Fundamentally, GPS systems calculate velocity in three components (X, Y, Z or N/S, E/W, and Up/Down) based on a Doppler shift of the GPS satellite signals. Scalar speeds can then be calculated from those three components. For example, absolute speed or actual vehicle speed can be determined, as well as ground speed based on the shortest distance between two points (i.e., based on distance as the crow flies). Horizontal ground speed ($V_{HGS}$) can be calculated using the Pythagorean Theorem. To calculate a grade (G) the vehicle is traveling over (as a percentage), one can take the Z/Up magnitude and divide it by the horizontal ground speed. Replacing Z, x and y with directional vectors (such as Up for Z, West for x and North for y, recognizing that such directional vectors are exemplary, and may change based on the actual GPS data collected from the vehicle) enables one to calculate slope. The slope data is then used to determine the mass of the vehicle at that time. Pervious techniques to calculate mass use torque output, engine RPMs, and vehicle velocity (scalar vehicle speed values can be used in place of velocity) to calculate a vehicle's mass or weight, but did not factor in slope, and thus are not accurate over routes including variable slopes (which most routes include). An improved mass metrics (by including the GPS derived slope data in a mass calculation) enables a more accurate weight based or work based performance metric to be provided.

In at least one exemplary embodiment, where the driver performance metric is based on a plurality of different parameters or metrics, each one of the plurality of metrics will correspond to a different aspect of the driver's performance while operating a vehicle. Those of ordinary skill in the art will readily recognize that a number of different types of sensors are commonly integrated into commercial, passenger, and fleet vehicles. Such sensors can readily collect a wide variety of operational data that are related to driver performance. For example, one such metric is idle time of a vehicle. Excessive idling time generates increased emissions, increased fuel consumption, and increased engine wear. From the point of view of the fleet operator, drivers who operate vehicles so as to incur relatively greater idle times exhibit a lower performance compared to drivers who do so while incurring relatively less idle time. Additional performance metrics related to both vehicle and driver performance include the amount of time the vehicle is accelerating during the operation of the vehicle by the driver, the extent of such acceleration, the amount of time the vehicle is decelerating during the operation of the vehicle by the driver, the extent of deceleration, whether (or how often) a driver deviates from a predefined route, and whether (or how often and to what extent) a driver exceeds a speed limit. Drivers who accelerate and decelerate often and accelerate or brake excessively are likely to increase fuel consumption, emissions, engine and/or brake wear, as compared to drivers who are more able to accelerate and decelerate modestly, and who are more able to maintain a constant speed.

By combining a plurality of vehicle metrics related to driver performance, a single numerical score or numerical ranking can be used to provide feedback to individual drivers. Such a numerical ranking can be used as a management tool to improve driver performance. For example, drivers with relatively poor numerical ranking scores can receive counseling or warnings, which should lead to an improvement in their performance, while drivers receiving relatively better scores receive praise or bonuses that encourage them and others to maintain or improve good performance in operating a vehicle. Comparing such scores across companies or between individual branches of a company can be used as a contest or as a motivational tool, where drivers with relatively better scores earn prizes or public praise. For example, a fleet operator could regularly post a list of driver performance rankings in company break rooms, so that drivers can compare their individual performance rankings with one another (note the concepts disclosed herein also encompass posting such scores on a website).

Essentially, for each metric collected, a numerical value will be determined for that metric. Different metrics can be weighted differently, according to the preference of the fleet operator. For example, if a fleet operator is particularly concerned about reducing excessive idle time, but is less concerned about drivers' acceleration and deceleration habits, idle time can weighted more significantly, to have a greater effect on the numerical ranking determined for the drivers than acceleration and deceleration metrics. Thus, in that case, increased idle time will have a greater proportional negative effect on a driver's overall score, than will excessive acceleration and deceleration of a vehicle.

Normalizing the combined numerical scores for each metric is important; as such normalization enables the numerical rankings for different drivers to be compared. In one embodiment, the normalization is based on dividing the combined rankings by the distance over which the driver has operated the vehicle. For example, the drivers' combined numerical values for each metric can be divided by the number of miles over which the driver has operated vehicle. In another embodiment, the normalization is based on dividing the combined rankings by the length of time the driver has operated a vehicle. For example, a driver's combined numerical values for each metric can be divided by the number of hours the driver has operated a vehicle.

Those of ordinary skill in the art will readily recognize that a variety of different valuation paradigms can be implemented for determining a numerical value for each metric. Under some paradigms, a relatively higher normalized combined total will represent relatively better driver performance, while under other paradigms a relatively lower normalized combined total will represent relatively better driver performance. The specific valuation paradigm employed is less important than the aspect of the present invention directed to providing a numerical value that can be used to evaluate driver performance, where the numerical value is based on measurable metrics corresponding to a driver's performance while operating a vehicle. It should also be recognized that the concepts presented herein can be applied to other types of equipment, such as heavy machinery and heavy construction equipment (backhoes, excavators, bulldozers, etc.), as well as to other types of equipment or machinery that an operator controls, so long as the various aspects of the operator's performance can be sensed and the results used to determine a numerical value representative of the overall quality with which the operator controls the equipment or machinery. It should also be recognized that the concepts provided herein can also be beneficially implemented in other types of vehicles, including automobiles (such as rental car fleets, government vehicles, and fleet vehicles assigned to sales representatives or other employees of a business).

As noted above, one of the metrics that can be beneficially employed relates to determining if a driver has deviated from a predefined route. This metric can be automatically determined by providing predefined route data comprising geographical coordinates, automatically collecting geographical coordinate data while the driver is operating the vehicle (for example using a global positioning satellite (GPS) receiver), and determining if the driver has deviated from the predefined route by comparing the collected geographical coordinate data with the predefined route data.

Yet another metric that can be beneficially employed relates to determining whether a driver has exceeded a speed limit, which can be automatically determined in several different fashions. In one embodiment, it can be determined if a driver has violated the speed limit by providing a baseline speed limit value (such as 60 miles an hour, for vehicles primarily operated on freeways), automatically collecting vehicle speed data while the driver is operating the vehicle on freeways, and determining if the driver has deviated from the baseline speed limit value by comparing the collected vehicle speed data with the baseline speed limit value (or distance traveled per unit time). In a different embodiment, the step of determining if the driver has violated the speed limit comprises the steps of providing predefined route data comprising geographical coordinates and speed limits associated with each geographical coordinate, automatically collecting geographical coordinate data and vehicle speed data while the driver is operating the vehicle, and determining if the driver has violated the speed limit by comparing the collected geographical coordinate data and vehicle speed data with the predefined route data for which the speed limit is specified at different portions of the route.

It should be recognized that the steps of collecting the plurality of metrics and processing the plurality of metrics to determine the numerical ranking of the driver's performance can be implemented in physically different locations. In one embodiment, the plurality of metrics are automatically collected by the vehicle, and then transmitted to a remote computing device for processing. The metrics can be transmitted to the remote computing device in real-time, or can be saved in a memory in the vehicle and later transmitted to the remote computing device for processing, for example, when the vehicle is returned to a central garaging facility. In other embodiments, processing of the plurality of the metrics occurs within the vehicle. Where the processing of the plurality of metrics occurs within the vehicle, the driver's current performance ranking can be displayed in real-time to the driver to provide immediate feedback to help the driver improve performance while operating a vehicle. This approach would be analogous to providing real-time fuel mileage estimates to a driver based on current vehicle operating conditions. Providing drivers with feedback in real-time will enable drivers to correct driving habits while operating the vehicle, leading to an improved performance ranking. In such an embodiment, it would be desirable to enable the driver to review the metrics responsible for decreasing a driver's performance ranking. For example, if the driver's current performance ranking is relatively low because the driver is frequently accelerating and decelerating, rather than maintaining a constant speed, the display provided to the driver can be customized to indicate the specific metrics responsible for the lower than desired performance ranking.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 3:
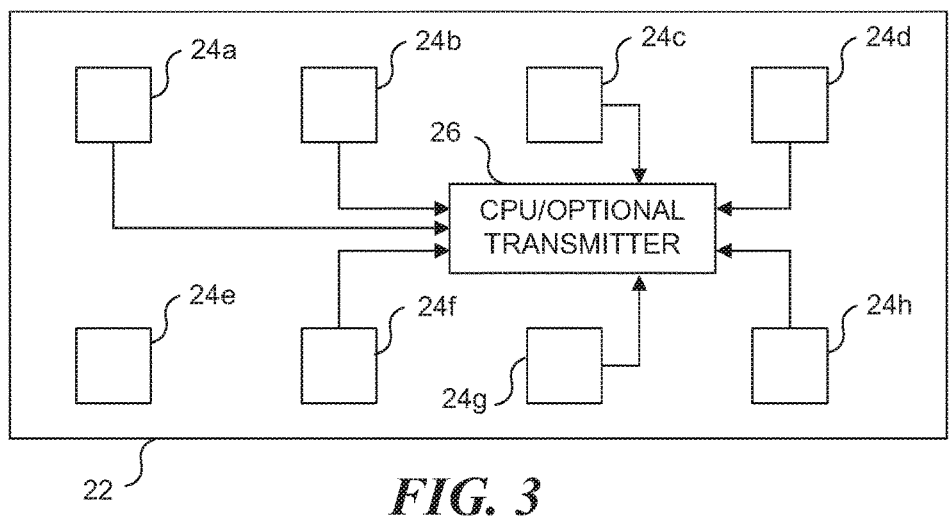
Figure 4A:
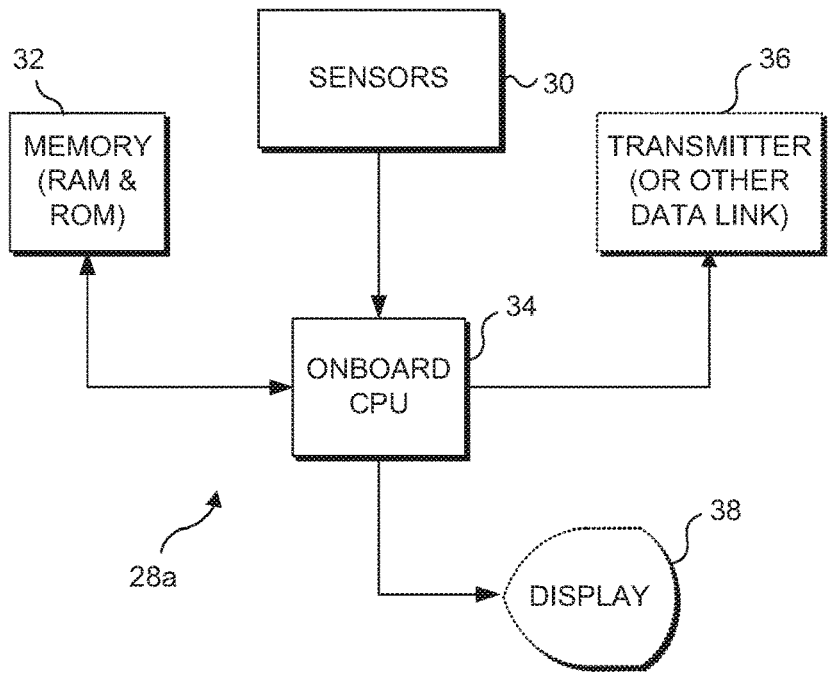
Figure 4B:
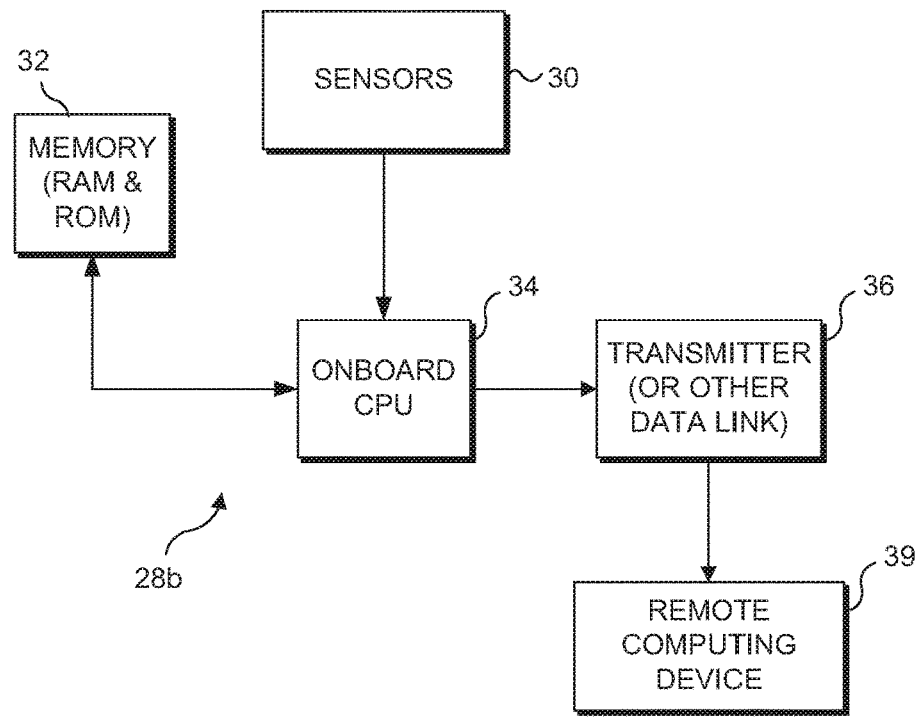
Figure 5:
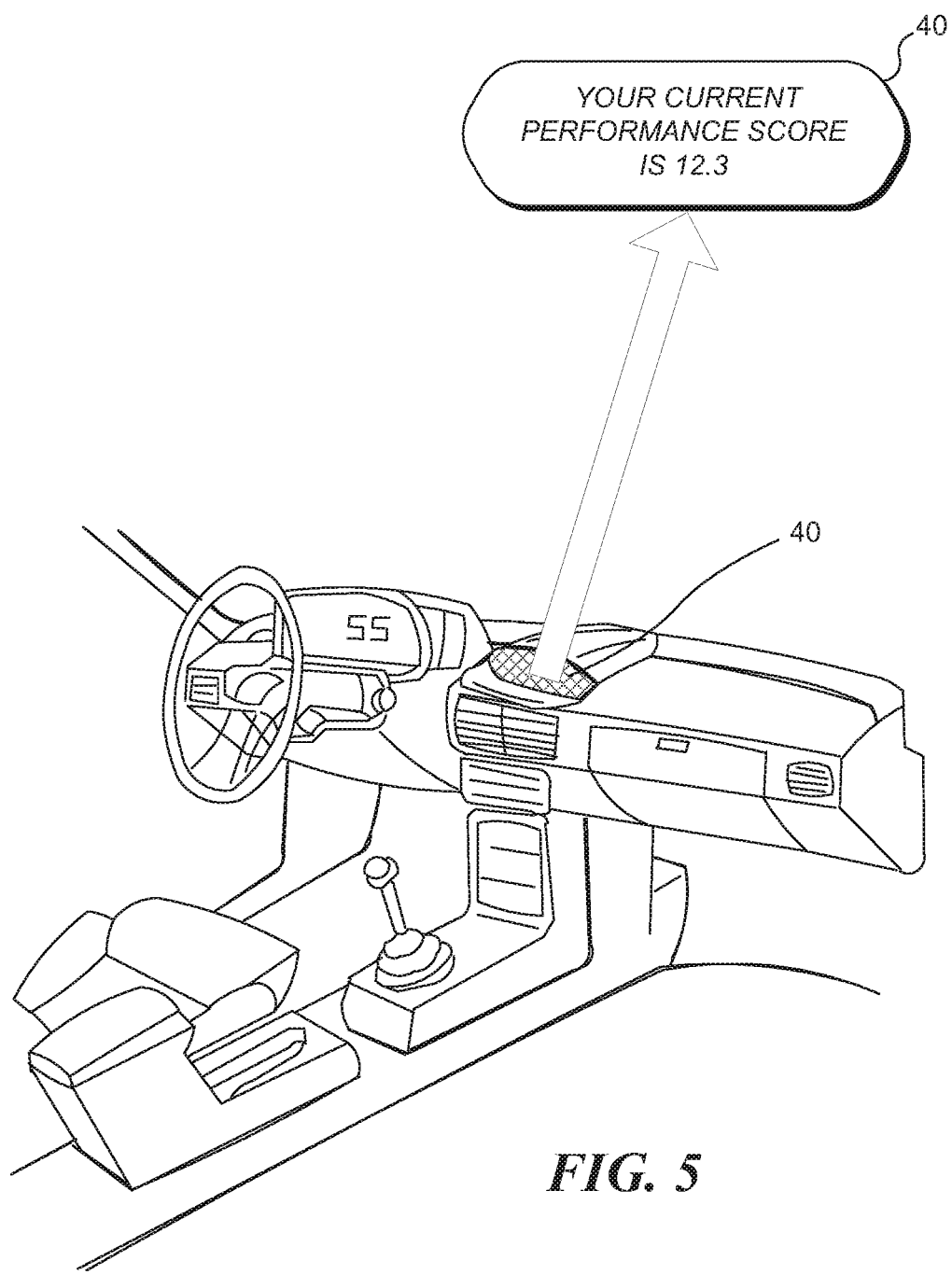
Figure 6:
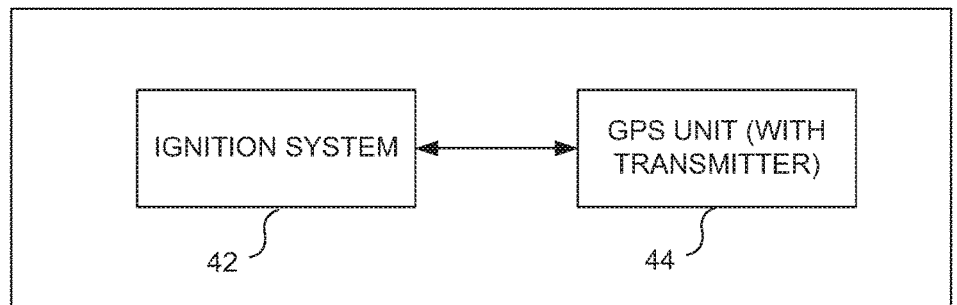
Figure 7:
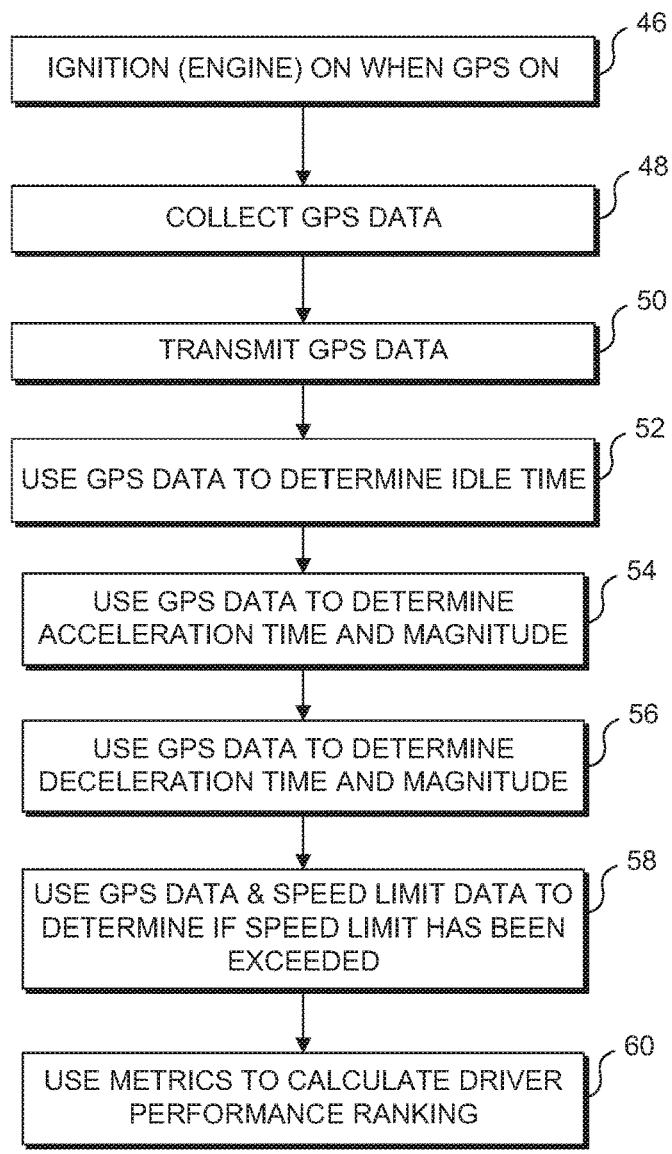
Figure 8:
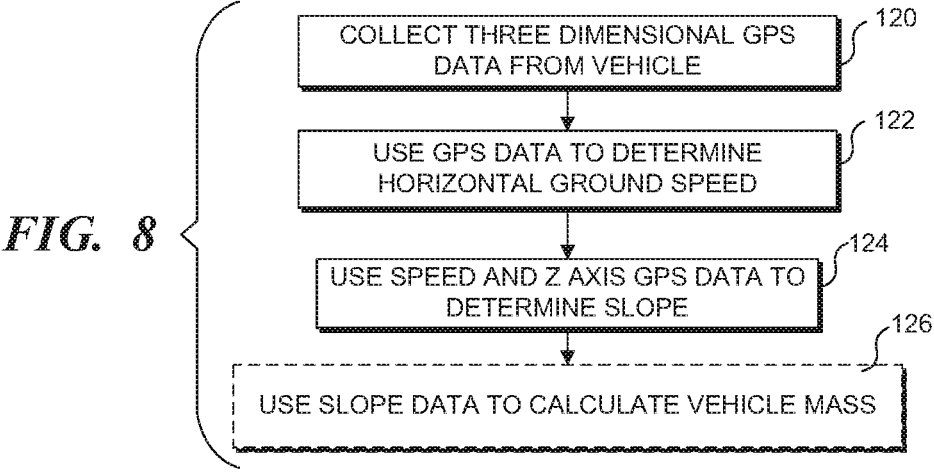
Figure 9:
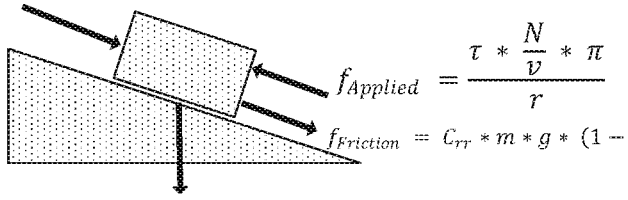
Figure 10:
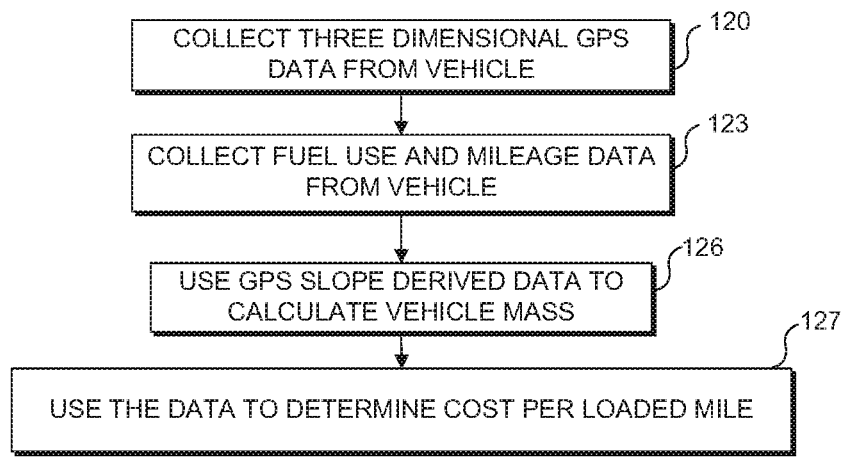
Figure 11A:
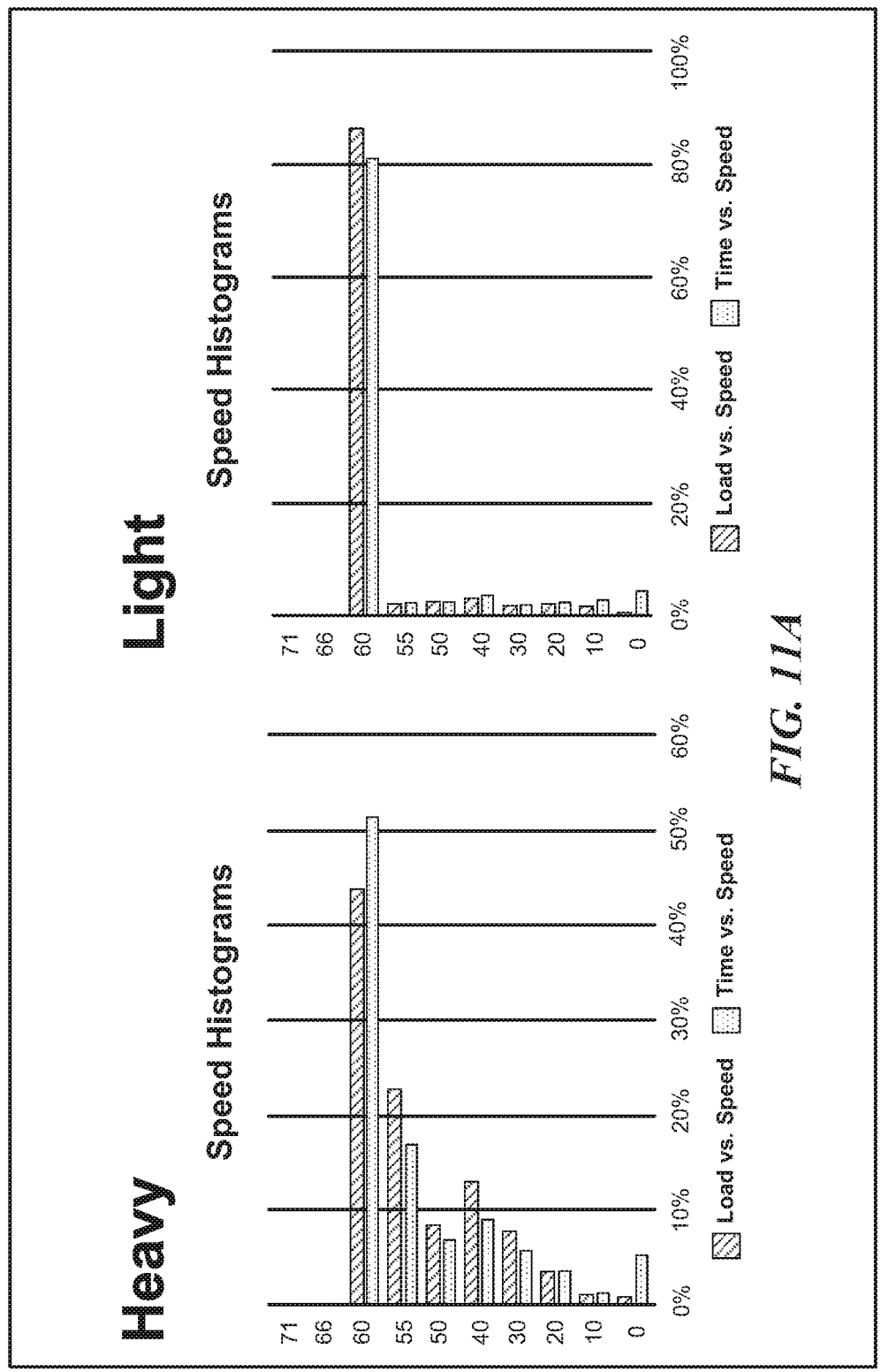
Figure 11B:
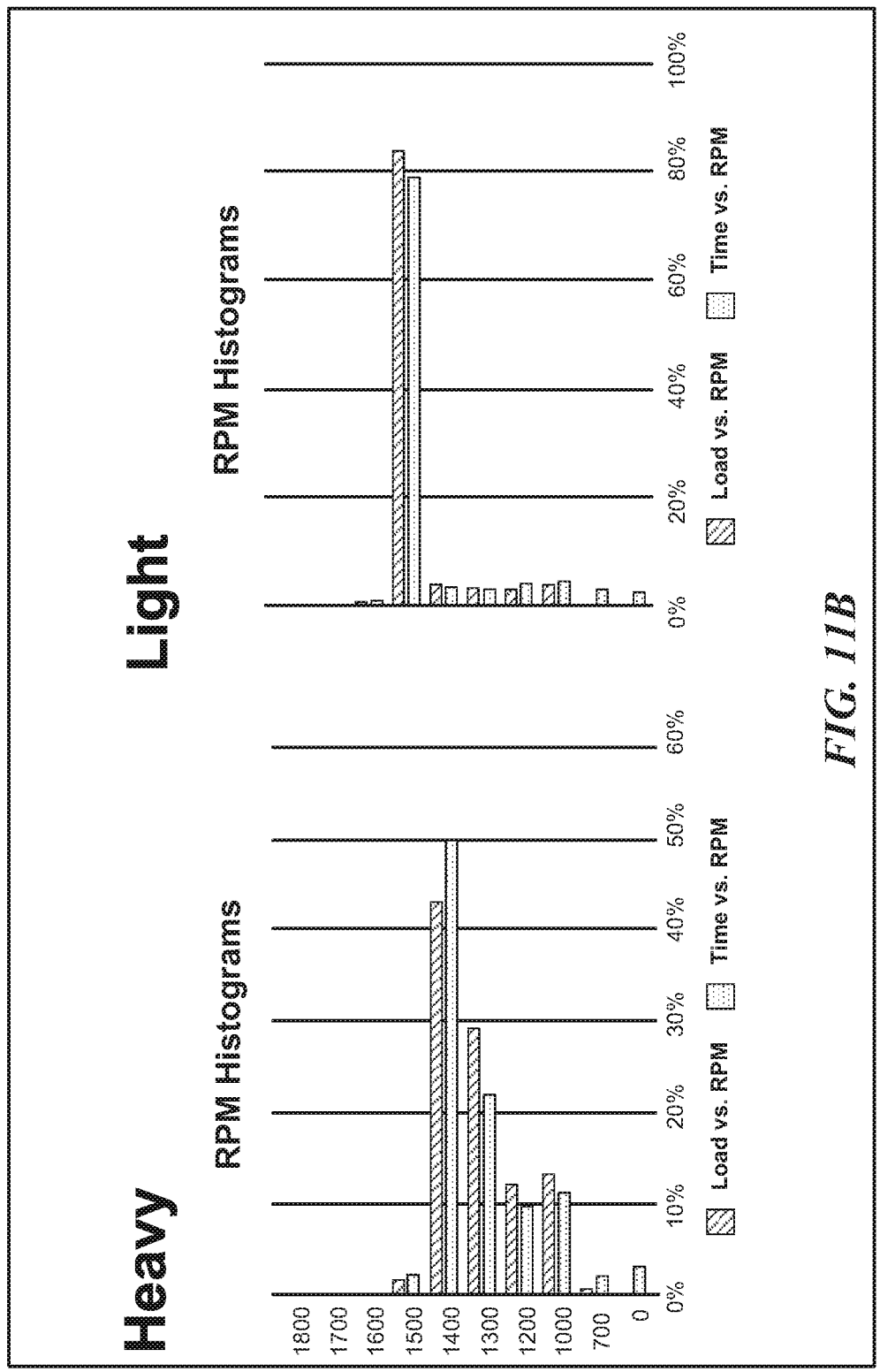
Figure 11C:
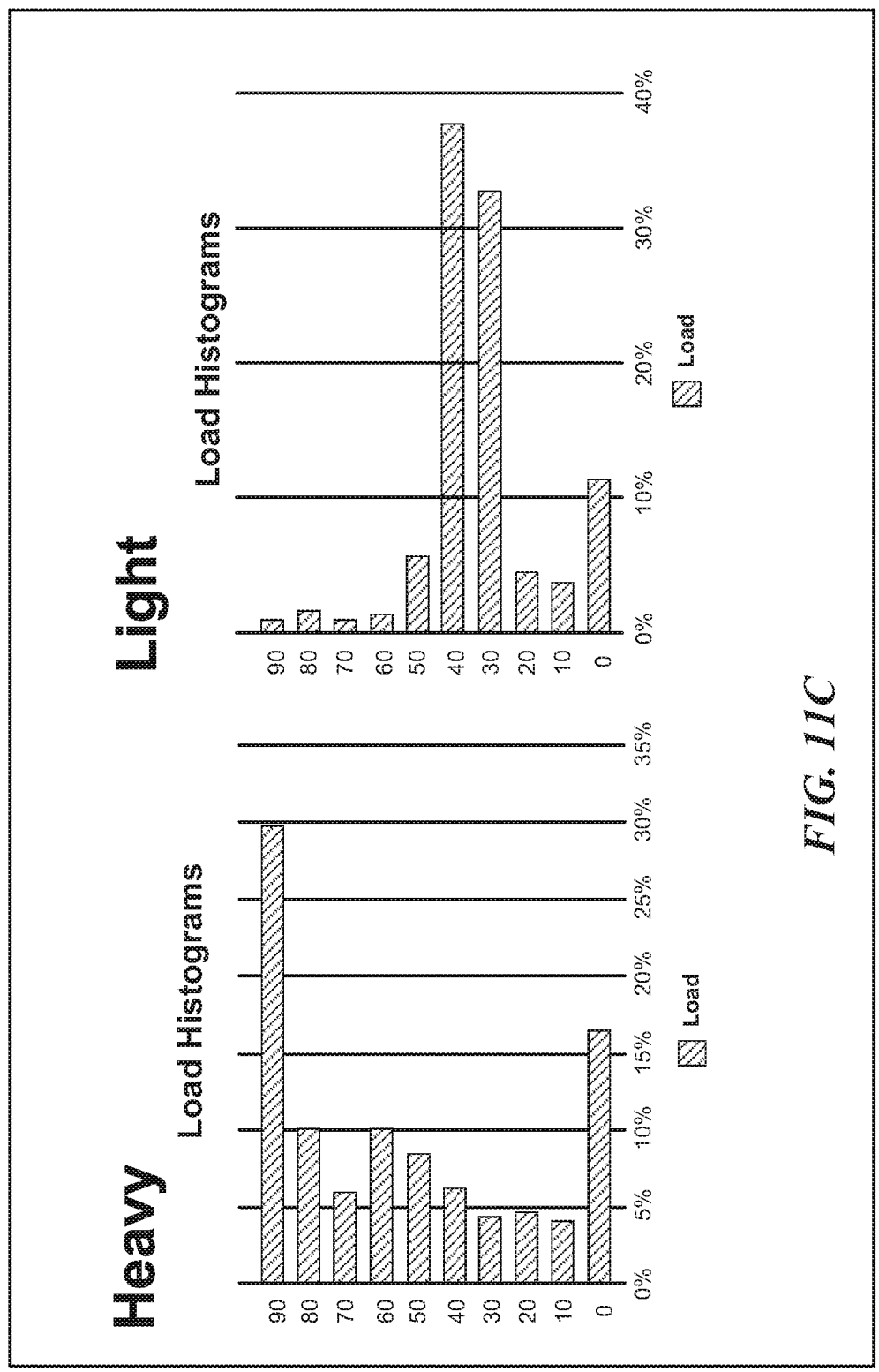
Figure 12A:
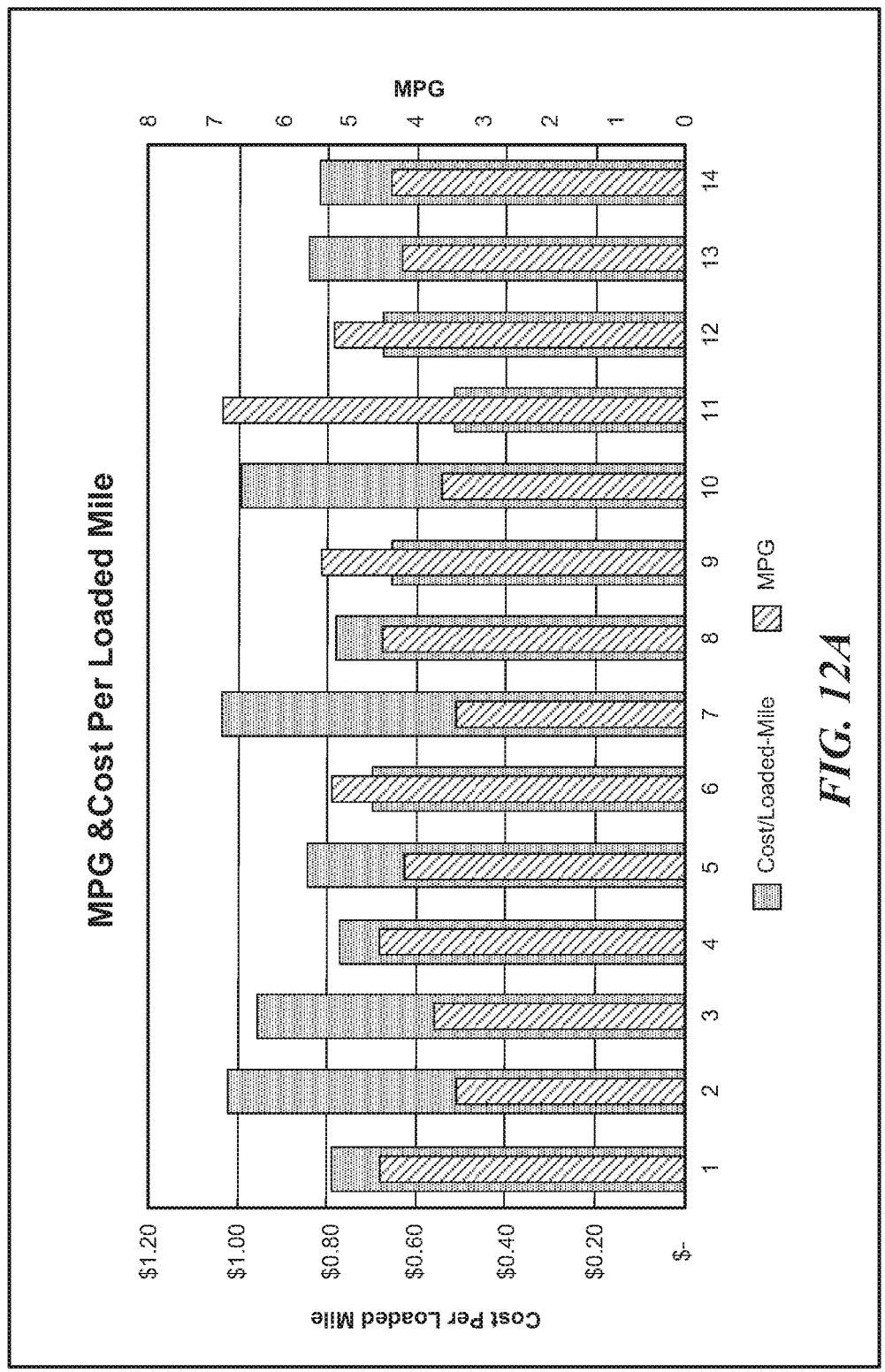
Figure 12B:
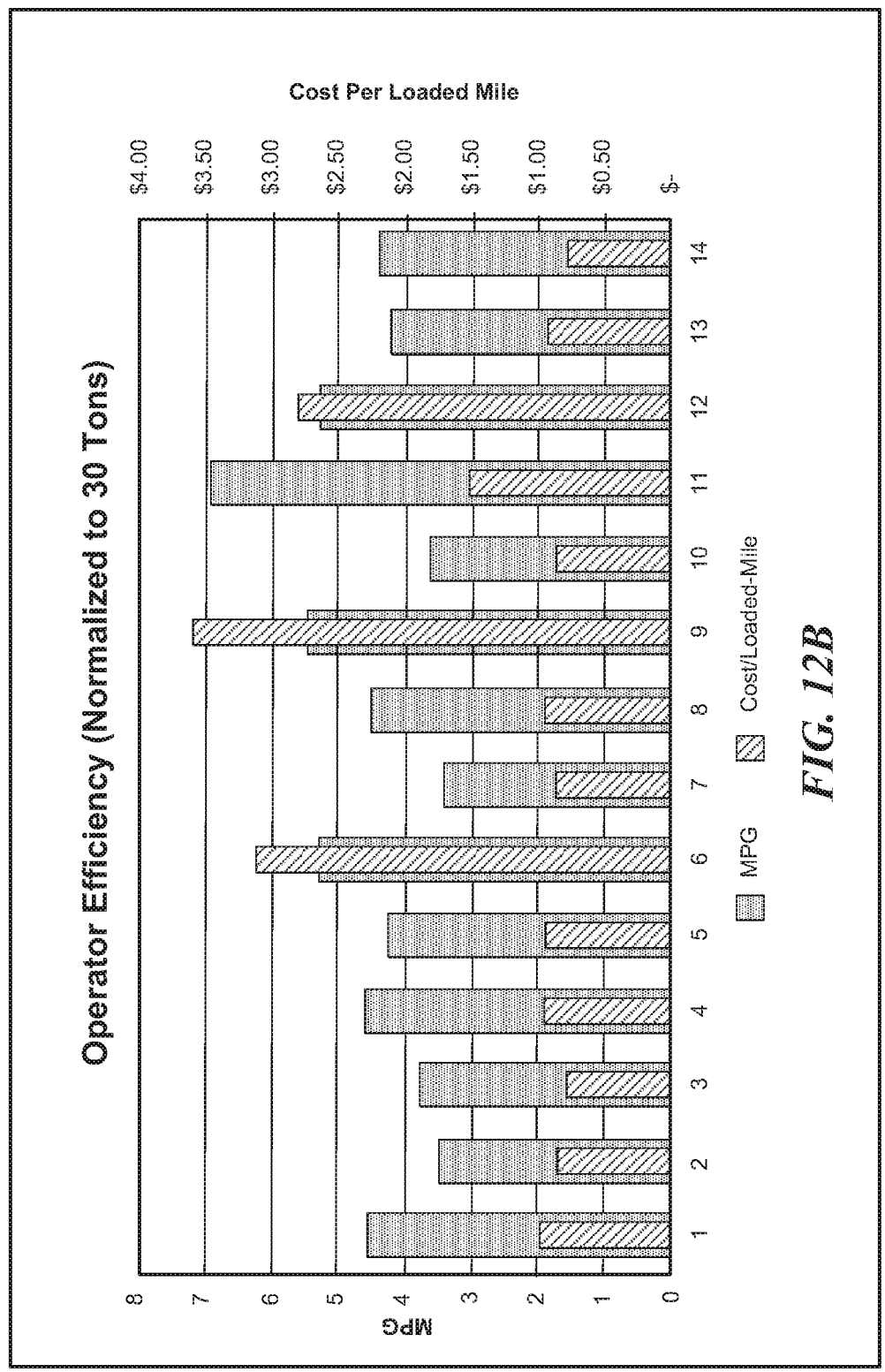
Figure 13:
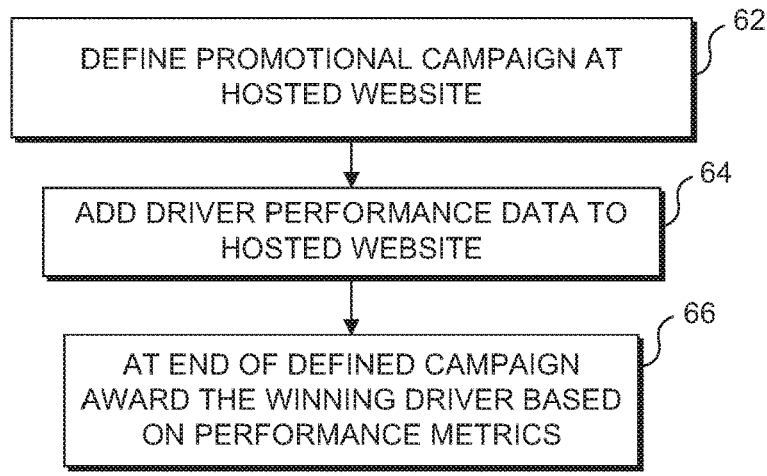
Figure 14:
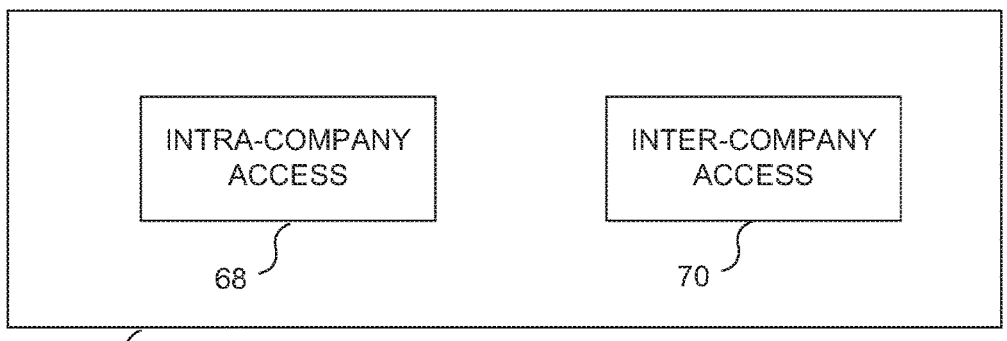
Figure 15:
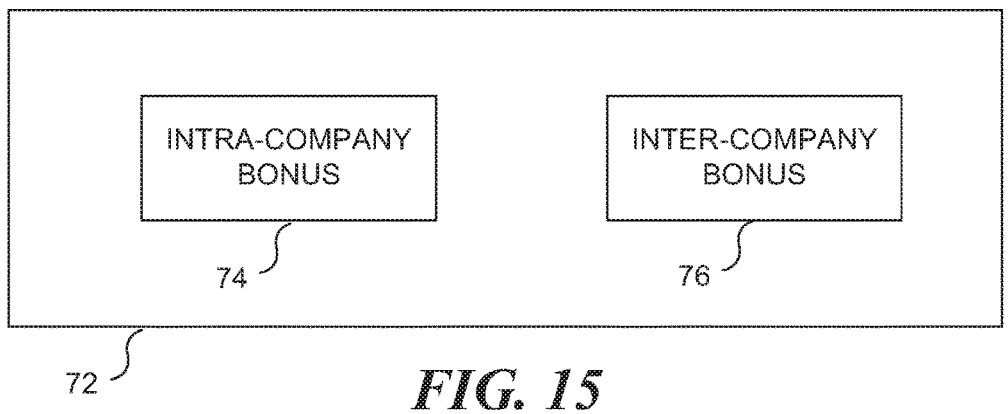
Figure 16:
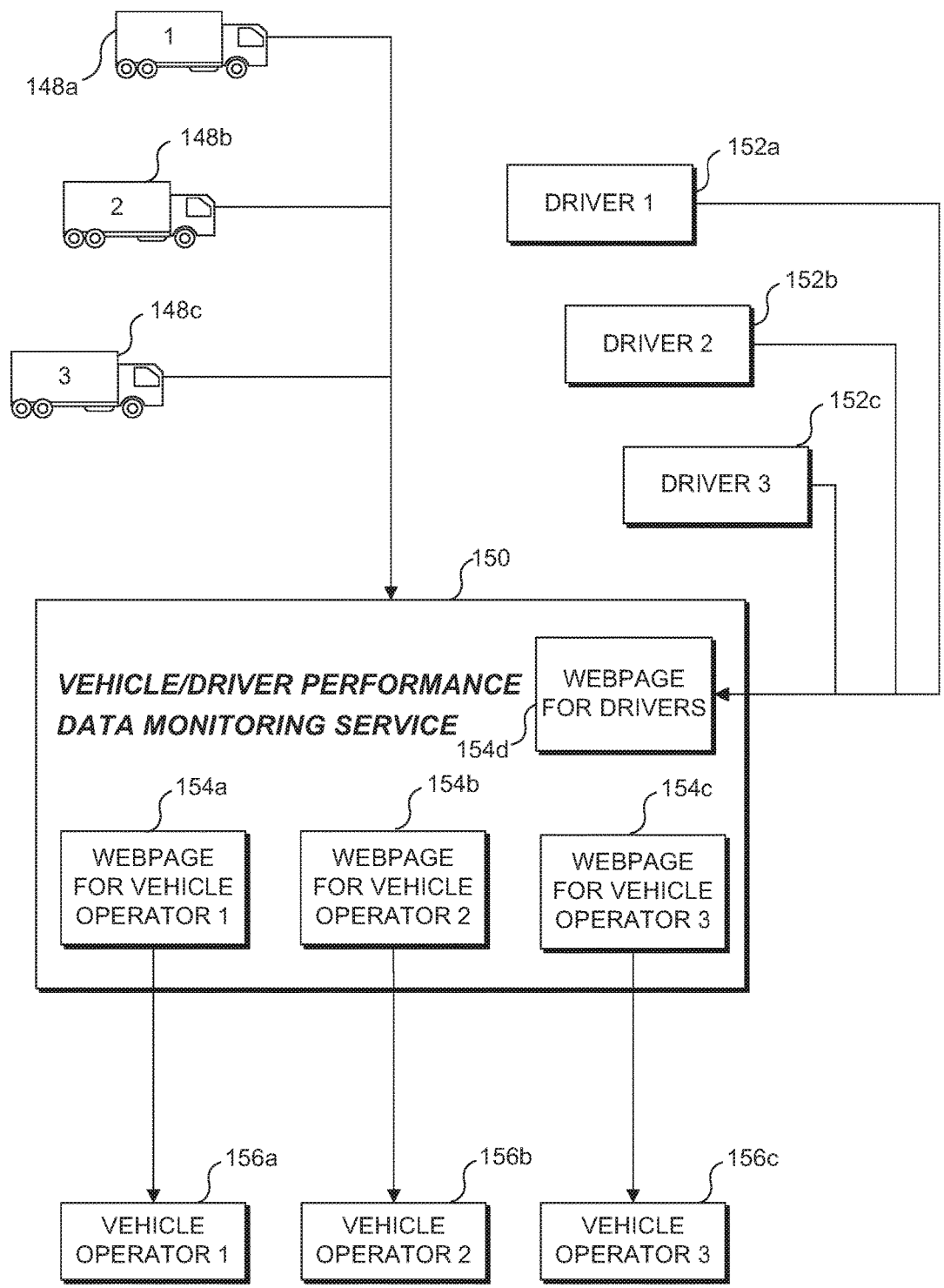
Figure 17:
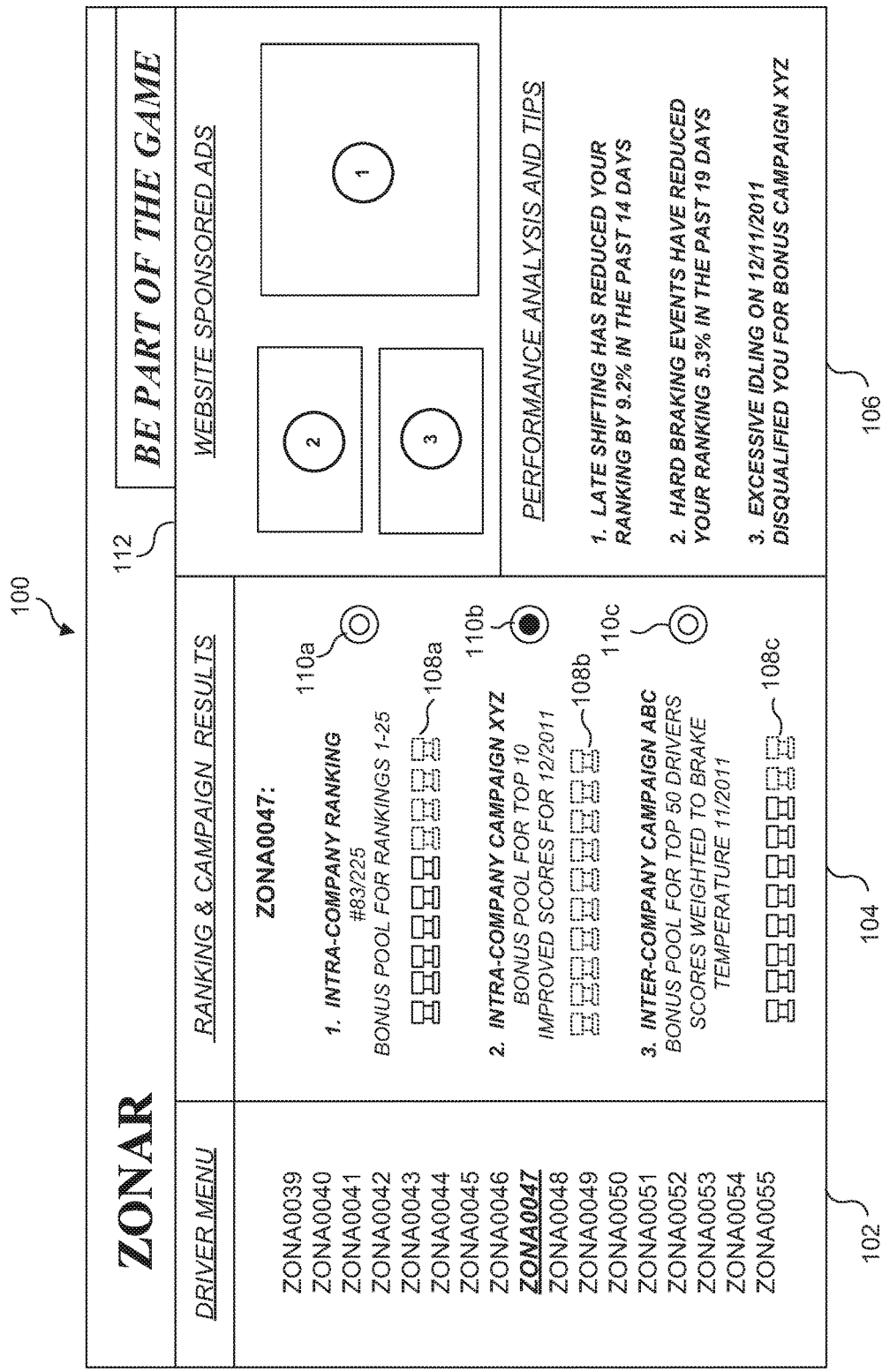
Figure 18:
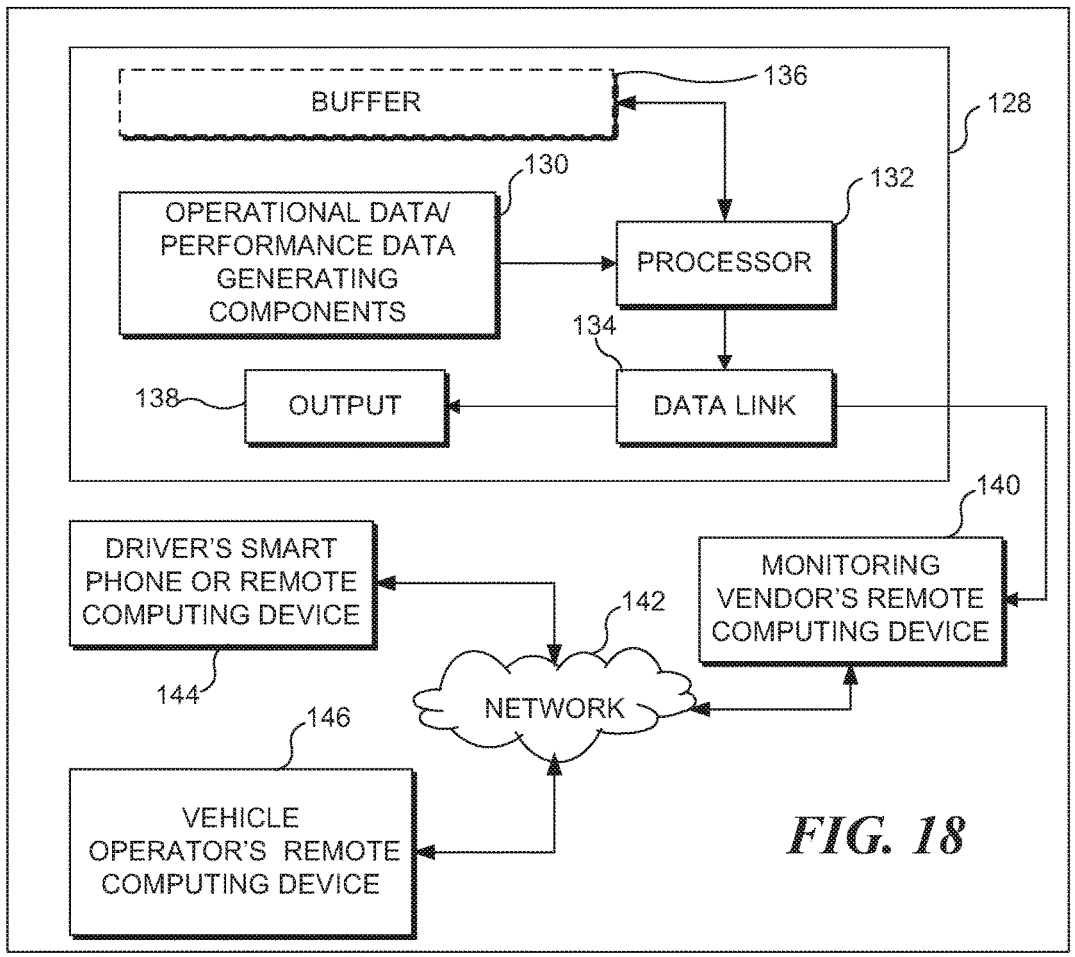
Figure 19:
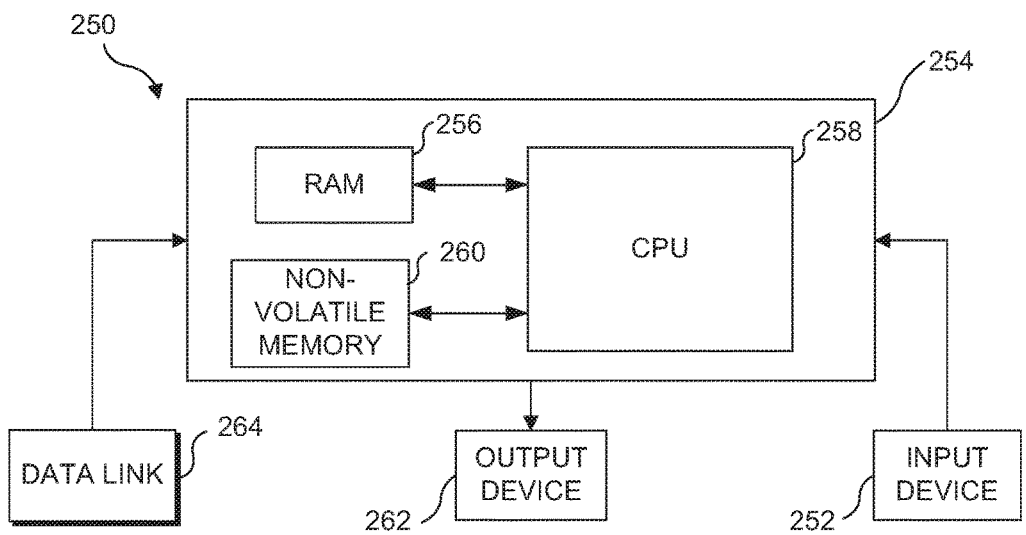
Figure 20:
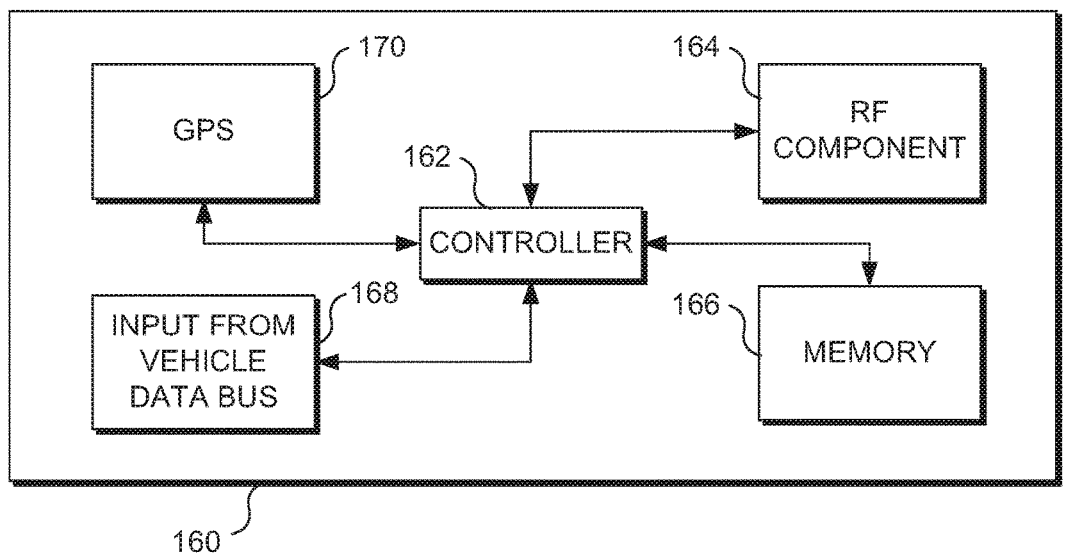

FIG. 3 schematically illustrates a vehicle that includes a plurality of sensors configured to collect the required metrics;

FIG. 4A is a functional block diagram illustrating the functional elements of an embodiment in which the metrics are processed within the vehicle to obtain the driver's performance ranking, for example, in real-time;

FIG. 4B is a functional block diagram illustrating the functional elements of an embodiment in which the metrics are processed by a computing device remote from the vehicle to obtain the driver's performance ranking;

FIG. 5 schematically illustrates the interior of a vehicle configured with a display to provide the driver with the performance ranking in real-time;

FIG. 6 schematically illustrates a vehicle that includes a GPS unit configured to collect GPS data that can be used to provide a plurality of metrics for use in determining a driver performance ranking in accord with one aspect of the concepts disclosed herein;

FIG. 7 is a flow chart showing method steps implemented in an exemplary preferred embodiment, where GPS data are used to provide a plurality of metrics used to determine the driver's performance ranking;

FIG. 8 is a flow chart showing method steps implemented in accord with one aspect of the concepts disclosed herein, the method steps representing an exemplary technique used to implement that aspect, the aspect comprising using GPS or position data are used to determine a slope the vehicle is traveling over (in at least one embodiment, the slope data will in turn be used to calculate an accurate vehicle mass metric);

FIG. 9 is a functional block diagram graphically illustrating force vectors acting on a vehicle, and how those vector can be used to solve for vehicle mass, where the GPS derived slope represents a unique metric;

FIG. 10 is a flow chart showing exemplary method steps implemented according to one aspect of the concepts disclosed herein, where GPS or position derived slope data is used to calculate a vehicle's mass at a plurality of intervals during the operation of a vehicle, and then using the vehicle mass to determine a cost per loaded mile;

FIGS. 11A-11C graphically illustrate vehicle performance histograms generated derived in part using the GPS derived slope data of FIG. 8;

FIGS. 12A-12B graphically illustrate vehicle performance histograms generated derived in part using the GPS derived slope data;

FIG. 13 is a flow chart showing exemplary method steps implemented according to one aspect of the concepts disclosed herein, in which a promotional driver performance campaign is implemented at a hosted website;

FIGS. 14 and 15 are functional blocks diagram illustrating that the promotional driver performance campaigns and bonuses of the method of FIG. 13 can include drivers from a single fleet (intra-company) or drivers from multiple fleets (inter-company);

FIG. 16 is a functional block diagram illustrating exemplary elements in a vehicle/driver performance monitoring system in accord with one aspect of the concepts disclosed herein;

FIG. 17 is an exemplary screen shot of a website hosting a promotional driver performance campaign;

FIG. 18 is a another functional block diagram illustrating exemplary elements in a vehicle/driver performance monitoring system in accord with one aspect of the concepts disclosed herein;

FIG. 19 is an exemplary computing environment for implementing some of the concepts disclosed herein; and FIG. 20 is a functional block diagram of an exemplary telematics device added to an enrolled vehicle to implement one or more of the methods of FIGS. 1, 2, 7, 8 and 10.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Exemplary Logic for Determining Driver Performance

Figure 1:
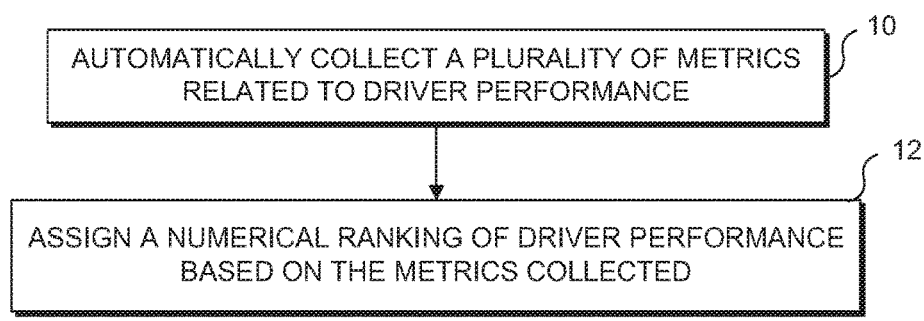
FIG. 1 is a high level flow chart showing the overall method steps implemented in accord with one exemplary embodiment for achieving the concepts disclosed herein.

FIG. 1 is a high level flow chart showing the overall method steps implemented in accord with one aspect of the concepts disclosed herein. In a block 10 a plurality of metrics related to driver performance are automatically collected by a plurality of sensors incorporated into a vehicle. Such metrics generally relate to driver operation of the vehicle, but may also simply include data related to the vehicle. Such metrics can include, but are not limited to, vehicle speed, vehicle acceleration, vehicle deceleration, engine RPMs, idle time, engine temperature, coolant temperature, oil temperature, fuel consumption, and vehicle positional data. Those of ordinary skill in the art will readily recognize that many different metrics related to vehicle performance and driver performance can be collected. Thus, it should be recognized that the specifically identified metrics are intended to be exemplary, rather than limiting. In a block 12, a numerical ranking of the driver's performance is determined based on at least some of the metrics collected.

Figure 2:
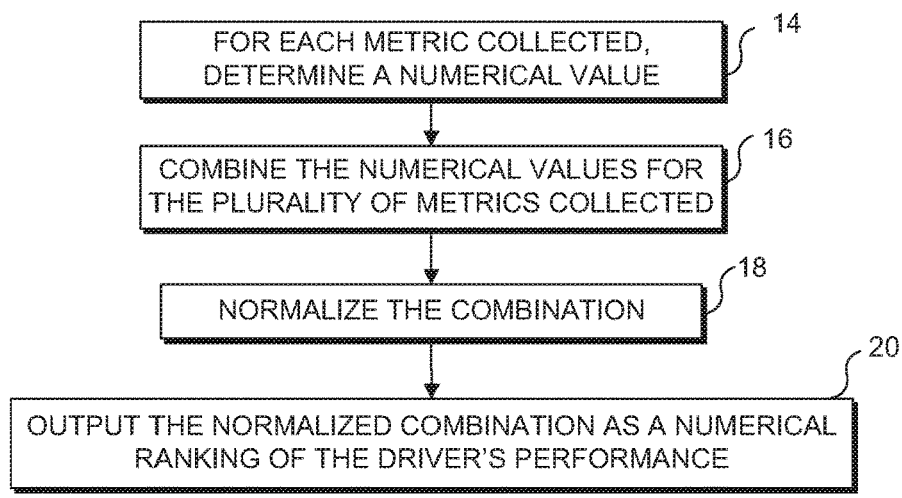
FIG. 2 is a more detailed flow chart showing method steps implemented in an exemplary preferred embodiment.

FIG. 2 is a more detailed flow chart showing method steps implemented in a preferred embodiment, providing additional details as to how the numerical ranking of the driver's performance can be determined. In a block 14, a numerical value is assigned to each metric collected. It should be recognized that plurality of valuation schemes can be implemented, and the specific scheme implemented is not critical. It should also be recognized that a fleet operator can perceive some metrics to be more or less important to overall driver performance. Thus, individual metrics can be weighted differently. For example, one fleet operator may have little tolerance for drivers who exceed posted speed limits and want to place great emphasis on this metric when determining the numerical ranking. Such a fleet operator can assign significantly more weight to the detection of a driver exceeding a speed limit than to the detection of a driver incurring excessive idle time. Regardless of the specific valuation scheme implemented, a numerical ranking will be determined for each metric collected. In a block 16, the numerical rankings for each metric are combined. In a block 18, the combined numerical values for each metric are normalized, to enable performance rankings for different drivers to be more equitably compared. In one embodiment, the normalization is based on a distance over which a driver has operated a vehicle. In another embodiment, the normalization is based on an amount of time the driver has operated a vehicle. This normalization enables the output of the normalized combined total to be provided as a numerical ranking in a block 20 indicating a driver's performance. Note that the valuation scheme implemented will determine whether a specific numerical value is indicative of a relatively good performance or a relatively poor performance. Under some valuation schemes, relatively higher combined and normalized numerical rankings are generally indicative of relatively better driver performance. In other valuation schemes, relatively lower combined and normalized numerical rankings are generally indicative of relatively better driver performance.

FIG. 3 schematically illustrates a vehicle including a plurality of sensors configured to collect the required metrics. A vehicle 22, such as a bus or a truck, includes a plurality of sensors 24a-24h. It should be recognized that the specific number of sensors, and the specific types of sensors and types of data collected by the sensors, are not critical, so long as the sensors collect data for the desired metrics. As noted above, a plurality of different metrics have been specifically identified, however it should be recognized that such metrics are intended to be exemplary, and not limiting on the concepts disclosed herein. In the disclosed exemplary embodiment, each sensor is coupled to a CPU 26 (which, as described in greater detail below, may in some of embodiments be replaced with (or provided in addition to) a transmitter).

FIG. 4A is a functional block diagram 28a illustrating the functional elements of an exemplary embodiment in which the metrics are processed within the vehicle to obtain the driver's performance ranking. The vehicle is equipped with sensors 30 configured to collect the required metrics. The sensors are logically coupled with an onboard vehicle CPU 34, which is configured to implement the method steps generally described above. CPU 34 is logically coupled to a memory 32 in which are stored the machine instructions that are executed by the CPU to carry out these logical steps. The plurality of metrics collected by sensors 30 can also be stored in memory 32. A (preferably optical or wireless) transmitter 36 (or other data link) can be included to enable either the plurality of metrics or the driver's performance ranking to be communicated to a remote computing device. An optional display 38 can be included in the vehicle to provide real-time feedback to the driver (by displaying the driver's performance ranking in real-time). As discussed above, if display 38 is implemented, it is desirable to provide the ability for the driver to determine which metrics are having the most impact on the driver's performance ranking.

FIG. 4B is a functional block diagram 28b illustrating the functional elements of an exemplary embodiment in which the metrics are processed by a computing device to obtain the driver's performance ranking, where the computing device is remote from the vehicle. Once again, the vehicle is equipped with sensors 30 configured to collect the required metrics. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above for processing the collected metrics can be executed by the remote computing device. CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, a display is not likely to be beneficial, unless the remote computing device is configured to transmit the calculated performance ranking back to the vehicle for display to the driver.

FIG. 5 schematically illustrates the interior of a vehicle configured with a display 40 to provide the driver with a performance ranking in real-time. As discussed above, such a display can be implemented by the embodiment schematically illustrated in FIG. 4A. While FIG. 5 shows a single numerical performance ranking being dis-played, it should be understood that the concepts disclosed herein encompass displaying a plurality of different metrics (at one or in rotation), as well as displaying a cost per loaded mile metric, which is discussed in detail below in connection with FIG. 10. The cost per loaded mile metric can be calculated using the concepts disclosed herein at a remote computing device and conveyed back to the vehicle for display, or can be calculated using a processor in the vehicle.

FIG. 6 schematically illustrates a vehicle 22a that includes a GPS unit 44 configured to collect GPS data that can be used to determine a plurality of metrics for use in determining a driver performance ranking. Such an embodiment enables the driver performance ranking discussed above to be generated without requiring individual or additional sensors to be integrated into the vehicle (although it should be recognized that such individual sensors could be used in addition to (or as an alternative source of) the data provided by the GPS unit, to provide additional metrics used in determining a driver's performance ranking, generally consistent with the method steps described above with respect to FIGS. 1 and 2). Vehicle 22a, such as a bus or a truck (or automobile, or construction equipment, generally as described above) includes GPS unit 44 coupled with an ignition system 42 of the vehicle. In an exemplary embodiment, the GPS unit will be coupled with the ignition switch, such that it is assumed that when the ignition switch is on, the engine of the vehicle is actually running, and the GPS unit will be activated. As described in greater detail below, GPS data can be used for a plurality of metrics, including idle time, deceleration time and magnitude, acceleration time and magnitude, and to determine if a driver has violated a speed limit. The most basic GPS unit is able to determine a position of the vehicle at a specific time. That positional information can be used to calculate the speed of a vehicle by determining the change in position of the vehicle between two successive points in time, and to calculate the acceleration or deceleration of the vehicle by determining the change in speed of the vehicle over a time increment. More typically, GPS units automatically determine position, speed, and acceleration/deceleration internally, and these metrics would then not need to be determined by an external computing device (remote or local).

GPS unit 44 preferably includes or is connected to a wireless transmitter (not separately shown), such that the GPS data can be wirelessly transmitted to a remote computing device, preferably in real-time. The remote computing device can be programmed to manipulate the GPS data to determine a plurality of metrics, which can then be used to calculate a driver's performance ranking, generally as described above. It should be recognized that as an alternative, GPS unit 44 can include an onboard memory, such that the GPS data are stored in the GPS unit, to be uploaded to a remote computing device at a later time (for example, using a wireless or hardwired data link). Significantly, GPS unit 44 enables driver performance rankings to be determined, even if the vehicle is not equipped with separate other sensors of the metric data or an onboard computer (as are required in the embodiments of FIGS. 3, 4A, and 4B). It should be understood that the concepts disclosed herein encompasses coupling such a GPS unit to vehicle sensors and/or a vehicle data bus, such that driver/vehicle performance data collected by other vehicle sensors can be combined with GPS data and conveyed to a remote computing site. While not specifically shown in FIG. 6, it should be understood that GPS unit 44 can include a processor that uses GPS data and sensor data collected from the vehicle to calculate performance metrics, which are then combined with GPS data and conveyed to the remote computing site. One such metric is GPS derived slope data, discussed in detail in below in connection with FIG. 8. Such performance metrics calculated by a processor in the vehicle (whether or not that processor is associated with a GPS unit, or is a separate processor in the vehicle) can be displayed in the vehicle, as well as (or in lieu of) being conveyed to a remote computing device.

FIG. 7 is a flow chart showing method steps implemented in one exemplary embodiment when GPS data are used to calculate a plurality of metrics used to determine the driver's performance ranking. In a block 46, the vehicle ignition is switched on (and it is assumed that the engine is running), thereby powering on the GPS unit. In a block 48, the GPS unit collects GPS data (information corresponding both to a particular point in time and a specific geographical position that the vehicle occupies at that specific point in time). In a block 50, the GPS data are transmitted to a remote computing device. As noted above, the GPS data are preferably transmitted to the remote computing device in real-time. However, it should be recognized that the GPS data can be temporarily stored within the GPS unit (or in a memory electronically coupled to the GPS unit), and transferred to the remote computing device at a later time. In a block 52, the remote computing device uses the GPS data to calculate an idle time metric. Because the GPS unit is only on when the ignition switch is on and the engine of the vehicle is assumed to be running, an assumption can be made that the idle time equals the accumulated time that the GPS unit is on, but the vehicle is not changing position.

In a block 54, the remote computing device uses the GPS data to determine metrics corresponding to acceleration time and acceleration magnitude. In a block 56, the remote computing device uses the GPS data to determine metrics corresponding to deceleration time and deceleration magnitude. In a block 58, the remote computing device uses the GPS data to determine whether a driver has exceeded a speed limit. Those of ordinary skill in the art will readily recognize that several mapping databases exist that include a database of speed limits and which enable a speed limit for a specific portion of a route being driven by a vehicle to be determined based on a particular geographical coordinate of the vehicle following that route. GPS data includes an indication of the speed of the vehicle at a particular time while the vehicle is at a particular geographical location. Once the vehicle speed has been determined for a particular geographical position, a database can be consulted to determine the speed limit associated with that position along the route, thereby enabling a determination to be made as to whether the driver has exceeded the speed limit. In a block 60, the plurality of metrics calculated from the GPS data are used to determine the driver's performance ranking, generally as described above in connection with FIGS. 1 and 2.

It should be recognized that the GPS data can be used to calculate fewer metrics than those described above in connection with FIG. 7, and that the metrics specifically identified in FIG. 7 are intended to be exemplary, rather than limiting. Furthermore, if the vehicle includes other sensors for determining metrics, the sensor data can also be forwarded to the remote computing device to be used in calculating the driver's performance ranking, also generally as described above. Furthermore, it should be recognized that rather than (or in addition to) transmitting the GPS data to a remote computing device, the GPS data can be conveyed to a computing device on the vehicle, for determining the driver's performance ranking.

Preferably, performance rankings are determined for each driver in a company (or each driver of a vehicle for which driver performance is of interest), and posted publicly so that drivers can compare each other's individual performance rankings. The public display of driver performance is expected to provide an incentive for drivers to improve their driving performance rankings.

It should be understood that the concepts disclosed herein encompass many differ types of performance metrics, and different techniques for collecting them. In at least some embodiments, as exemplified by FIG. 6, the performance metrics are transmitted from the vehicle to a remote computing device by a wireless data link enabled GPS unit (such as a GSM/GPS), that also collects location data during the vehicle's operation. It should be understood that such performance metrics can also be collected using a data recorder that does not have wireless data transmission capability, such that data will need to be exported from the data recorder to a remote computing device periodically, or the data recorder will need to be removed from the vehicle and coupled to a computing device periodically to export the data used to calculate the driver performance metric(s).

While specific parameters or metrics used to derive a driver performance metric have been discussed above, it should be recognized that the following different parameters/metrics are specifically encompassed herein. One or more embodiments in which the performance metric is based at least in part from data collected from one or more engine control units (or vehicle computer) in a vehicle operated by the driver whose performance is being measured. One or more embodiments in which the performance metric is based at least in part on fuel economy. One or more embodiments in which the performance metric is based at least in part on carbon footprint reduction. One or more embodiments in which the performance metric is based at least in part on minimizing fuel efficiency robbing behavior, including sudden braking, rapid acceleration and downshifting too early. One or more embodiments in which the performance metric is based at least in part on maximizing fuel efficiency enhancing behavior, including coasting to a stop (instead of staying on the accelerator until the last minute and then braking hard), high average vehicle speeds with minimum time spent at maximum vehicle speed, high percent trip distance in top gear (90+% recommended), high percent distance in cruise control, minimum percent idle/PTO operation, minimum service brake activity, low number of sudden decelerations, and low service brake actuation's/1000 miles.

Another aspect of the concepts disclosed herein is a technique to monitor vehicle location data (i.e. GPS data) over time to determine the actual operating speed of a fleet vehicle. Many fleet operators have the ability to define maximum speed parameters on their vehicles. Maximum speed parameters are defined to enhance safety and to reduce fuel costs (statistics indicated that for heavy trucks every MPH over 62 MPH reduces fuel economy by 0.1 MPG). However, these speed settings can fail due to maintenance issues, or driver manipulations. The maximum speed setting is based on understanding the size of the vehicle's tires. If during maintenance a different size tire is used as a replacement, the predefined speed settings will be inaccurate. Because drivers are often paid by the mile, drivers have an incentive to defeat the maximum speed settings, and drivers may encourage the use of different tire sizes, so they can go faster than the maximum speed setting, to increase their earnings. Drivers can also purchase and install aftermarket kits designed to bypass speed governors, again so they can go faster than the maximum speed setting, to increase their earnings. The concepts disclosed herein encompass collecting GPS data during the operation of a fleet vehicle, and analyzing the location and time parameters of that data to identify when a fleet vehicle exceeds a predefined maximum speed. The GPS verified speed metric can be used as a driver performance metric on its own, or be combined with other metrics to generate a driver performance metric.

Another aspect of the concepts disclosed herein is to monitor manual overrides for cooling fans in fleet vehicles. Such cooling fans, generally controlled by a vehicle engine control unit (ECU) or vehicle computer, consume up to 50-70 HP, and measurably reduce fuel economy. Drivers who habitually override the automatic fan settings can consume unnecessary amounts of fuel. Thus the concepts disclosed herein encompass monitoring a driver's use of cooling fan manual override, to facilitate an evaluation of a driver's performance, and to enable drivers who use such overrides excessively to be identified and trained to reduce their use of manual cooling fan overrides. The cooling fan manual override metric can be used as a driver performance metric on its own, or be combined with other metrics to generate a driver performance metric.

Another aspect of the concepts disclosed herein is to monitor engine RPMs during a driver's operation of a vehicle. Over revving an engine can lead to increased fuel use and engine wear. Drivers who habitually over rev their vehicles engines can consume unnecessary amounts of fuel. Thus the concepts disclosed herein encompass monitoring the RPM parameters while a driver operates a vehicle, to facilitate an evaluation of a driver's performance, and to enable drivers who consistently over rev their vehicle's engines to be identified and trained to reduce their over revving behavior. The over revving metric can be used as a driver performance metric on its own, or be combined with other metrics to generate a driver performance metric.

Another aspect of the concepts disclosed herein is to monitor the shifting behavior during a driver's operation of a vehicle. Not running a heavy truck in the highest possible gear when possible can lead to increased fuel use and engine wear. Statistics indicate that every 10% drop of time in top gear results in a 0.5% MPG loss. Thus the concepts disclosed herein encompass monitoring shifting behavior while a driver operates a vehicle, to facilitate an evaluation of a driver's performance, and to enable drivers who consistently under shift to be identified and trained to reduce their over revving behavior. The shifting pattern metric can be used as a driver performance metric on its own, or be combined with other metrics to generate a driver performance metric.

Another aspect of the concepts disclosed herein is to monitor the amount if idle time during a driver's operation of a vehicle. Increased idle time leads to increased fuel use and engine wear. Thus the concepts disclosed herein encompass monitoring idle time behavior while a driver operates a vehicle, to facilitate an evaluation of a driver's performance, and to enable drivers who excessively allow their vehicle to idle to be identified and trained to reduce their excess idle behavior. The excessive idle metric can be used as a driver performance metric on its own, or be combined with other metrics to generate a driver performance metric.

Another aspect of the concepts disclosed herein is to monitor a load placed upon a vehicle's engine during a driver's operation of a vehicle. While related to RPM, load is not equivalent. An estimation of engine load is sometimes calculated by a vehicle ECU, and different manufacturers use different combinations of parameters to calculate engine load, including but not limited to throttle position, RPM, manifold pressure, air flow, temperature, air conditioning clutch status, power steering pressure, and transmission gear status. Where engine load is increased without performing more useful work (i.e., carrying more cargo), increased fuel use and engine wear result without a net benefit. Drivers who habitually operate their vehicles under higher engine loads than required consume unnecessary amounts of fuel. Thus the concepts disclosed herein encompass monitoring engine load while a driver operates a vehicle, to facilitate an evaluation of a driver's performance, and to enable drivers who consistently over load their vehicle's engines to be identified and trained to reduce their over loading behavior. The engine load metric can be used as a driver performance metric on its own, or be combined with other metrics to generate a driver performance metric.

Calculation of an Exemplary Performance Ranking

The calculation of an exemplary performance ranking is described below in regard to one exemplary embodiment. It should be recognized that this approach for determining the performance ranking is not intended to be limiting, but rather to be illustrative of one contemplated valuation scheme and performance ranking implementation. In the exemplary performance ranking, a relatively higher numerical ranking value is generally indicative of relatively poorer driver performance. Thus, in this example, the lower the numerical performance ranking, the better the driver's performance.

In this example, the sensor data are collected for various metrics corresponding to vehicle acceleration, vehicle deceleration, vehicle idle time, and vehicle speed. Each minute of acceleration time will be assigned one point. Each minute of deceleration time will be assigned one point. Each minute of idle time will be assigned one point. In this example, the fleet operator is also particularly concerned with drivers who violate speed limits on the freeway. Thus, each minute where the vehicle speed exceeds 60 miles an hour while the driver is driving the vehicle on the freeway will result in five points (the fleet operator weighting excessive vehicle speed five times greater than the other metrics). The points are added together to achieve a combined total. The total is then normalized to derive a numerical ranking value for the driver. As noted above, the normalization can be based on either distance driven or time of operation, or a combination thereof.

Calculation of a Work Based Performance Ranking Using GPS Derived Slope Data

The concepts disclosed herein encompass using data collected during the operation of a vehicle to calculate a weight of the vehicle, and then using the calculated weight in a performance analysis of the vehicle. The novel vehicle weight calculation disclosed herein employs in part vehicle position data collected while a vehicle is moving. The position metric can be automatically determined using a global positioning satellite (GPS) receiver installed in the vehicle, to track the vehicle's change in position over time. It should be recognized that the GPS system is but one of a plurality of different vehicle position sensing technologies that can be employed.

Fundamentally, GPS systems calculate velocity in three components (X, Y, Z or N/S, E/W, and Up/Down) based on a Doppler shift of the GPS satellite signals. Scalar speeds can then be calculated from those three components. For example, absolute speed or actual vehicle speed can be determined, as well as ground speed based on the shortest distance between two points (i.e., based on distance as the crow flies).

Horizontal ground speed ($V_{HGS}$) can be calculated using the following relationship based on the Pythagorean theorem:

$$V_{HGS} = \sqrt{x^2 + y^2} \quad (1)$$

To calculate a grade (G) the vehicle is traveling over (as a percentage), one can take the Z/Up magnitude and divide it by the horizontal ground speed, $V_{HGS}$, which results in the following relationship:

$$G = \frac{100(Z)}{V_{HGS}} \quad (2)$$

Replacing Z, x and y with directional vectors (such as Up for Z, West for x and North for y, recognizing that such directional vectors are exemplary, and may change based on the actual GPS data collected from the vehicle) results in the following relationship:

$$G = \frac{100(Up)}{\sqrt{W^2 + N^2}} \quad (3)$$

Once one has derived G as discussed above, very useful vehicle performance metrics can be determined.

One exemplary use of the slope data is to determine the mass of the vehicle at that time. Mass is a useful metric that can be used as a feedback metric for controlling certain vehicle systems. Some vehicle engine control units (ECUs) use torque output, engine RPMs, and vehicle velocity (noting that scalar vehicle speed can be used for velocity) to calculate a vehicle's mass or weight (as used herein and in the claims that follow, the terms mass and weight are used synonymously, because on the surface of the Earth, the acceleration due to gravity (the "strength of gravity") is approximately constant; thus the ratio of the weight force of a motionless object on the surface of the Earth to its mass is almost independent of its location, so that an object's weight force can stand as a proxy for its mass, and vice versa). That ECU weight/mass determination technique is error prone, because it does not take into account any slope conditions. Even though the ECU weight/mass determination technique is error prone, the ECU weight/mass determination technique mass estimation provides a metric that can be used to as a feedback metric for various vehicle systems, including transmission shift points, engine RPM control, and emission controls. Having more accurate mass metrics (by including the GPS derived slope data in a mass calculation) will provide an improved mass metric. The concepts disclosed herein specifically encompass a GPS unit configured to use GPS data to calculate slope, to use the slope data and other vehicle parameters to determine vehicle mass (generally as discussed below), and then to provide a GPS slope based vehicle mass metric to a vehicle ECU to be used as a metric to control vehicle operation.

Vehicle mass can also be used as an analytical metric to determine how much work a vehicle has performed. Being able to accurately determine the amount of work a vehicle performs will help vehicle operators analyze their use patterns to seek out efficiency improvements. The GPS derived slope data enables more accurate vehicle mass calculations to be determined, which in turn will provide an improved vehicle performance data set that can be mined to identify areas in which efficiency improvements could be made.

Having described the GPS based slope determination technique; the following relationships will be used to obtain vehicle mass from the GPS determined slope (G). These relationships define the forces acting on the vehicle, and include a force related to a grade the vehicle is traveling over, an aerodynamic force, a frictional force, and a force applied by the vehicle to overcome the forces acting on the vehicle. The understanding of these forces is not new, but what is novel are techniques disclosed herein to measure certain parameters that are used to calculate such forces. Being able to measure those parameters, such as a grade the vehicle is traveling over, enables more accurate force calculations to be performed, which in turn enables a better understanding of vehicle operational efficiency.

It should be understood that with respect to calculating mass, the equations discussed below refer to the velocity of the vehicle as a parameter. Vehicle speed is a scalar quantity; whereas velocity is a vector (velocity is the rate of change of the position of an object, equivalent to a specification of its speed and direction of motion). In other words, speed describes only how fast an object is moving; whereas velocity gives both how fast and in what direction the object is moving. In terms of using position data, such as GPS data, to determine slope, position data changing over time provides three-dimensional vectors (speed and direction) that can be used to derive slope, generally as discussed above. With respect to calculating mass, it is important to recognize that scalar values can be used in place of vectors, while still providing useful results. Thus, it should be understood that the scalar parameter of vehicle speed can be used in place of the velocity parameter discussed below when using the following relationships to determine vehicle mass. Vehicle speed (which in the terms of vehicle arts is often inaccurately referred to as velocity) is generally available in the vehicle from a vehicle ECU or speed sensor (most over the road vehicles, such as trucks and buses, are equipped with relatively accurate speed sensors). While the GPS unit can be used to determine vehicle speed by tracking changes in position over time, in general the resolution of vehicle speed measurements taken from vehicle speed sensors is greater than a resolution of vehicle speed derived from changes in GPS data over time (or other position data), and thus the use of vehicle speed data from vehicle speed sensors is quite useful for the following mass determination techniques.

A first force opposing a motion of the vehicle relates to a grade or slope the vehicle is traveling over, which can be defined using the relationship of Equation (4).

$$f_{grade} = m*g*G \tag{4}$$

where m is vehicle mass and g is the local gravitational field (i.e., Earth's gravity).

A second force opposing a motion of the vehicle relates to aerodynamic forces acting on the vehicle, which can be defined using the relationship of Equation (5).

$$f_{areo} = \tfrac{1}{2}*p*C_d*A*v^2 \tag{5}$$

where p is air density, $C_d$ is the coefficient of drag of the vehicle, A is the frontal area of the vehicle, and v is the vehicle velocity (which can be obtained from the vehicle data bus as speed or from GPS data).

A third force opposing a motion of the vehicle relates to frictional forces acting on the vehicle, which can be defined using the relationship of Equation (6).

$$f_{Friction} = C_{rr}*m*g*(1-G) \tag{6}$$

where $C_{rr}$ is the coefficient of rolling resistance of the vehicle (which is assumed to be constant), m is vehicle mass, g is the local gravitational field (i.e., Earth's gravity), and G is the slope, which is calculated using the GPS data as discussed above.

The force generated by the vehicle to overcome these opposing forces can be defined using the relationship of Equation (7).

$$f_{Applied} = \frac{\tau * \dfrac{N}{v} * \pi}{r} \tag{7}$$

where τ is engine output torque (as measured at the vehicle by vehicle sensors/reported by the vehicle data bus), N is engine RMPs (as measured at the vehicle by vehicle sensors/reported by the vehicle data bus), v is the vehicle velocity (which can be obtained from the vehicle data bus or from GPS data), π is the mathematical constant defined as the ratio of any circle's circumference to its diameter, and r is the radius of the vehicles tires.

Vehicle mass is a parameter in the grade and frictional force relationships, of Equations (4) and (6), respectively. The mass parameter itself can be defined using the relationship of Equation (8).

$$m = \frac{f_{Applied} - f_{Friction} - f_{Grade} - f_{Aero}}{\alpha} \tag{8}$$

where m is vehicle mass and α is acceleration (which can be obtained from the vehicle data bus or from GPS data). In an exemplary embodiment, acceleration is obtained from the vehicle sensors.

Equations (4)-(8) can be solved to obtain mass, as defined using the relationship of Equation (9).

$$m = \frac{f_{Applied} - f_{Aero}}{a + g*(C_{rr} + S - C_{rr}*S)} \tag{9}$$

Note that the following parameters will be measured during vehicle operation in order for mass to be calculated: velocity (or speed), torque, RPM. Those parameters, combined with the GPS derived slope data, and known parameters (gravity, air density, rolling resistance, frontal area, drag, π (pi), and tire radius, such parameters can be programmed into the a telematics device or processor at the vehicle) can be used by a processor in the vehicle to calculate mass. Velocity (or speed), torque, and RPM represent metrics that many vehicles already measure during vehicle operation, and thus can be accessed by tapping into a vehicle ECU or data bus. The concepts disclosed herein specifically encompass a GPS unit (or other position sensing unit) including a data port coupled to a vehicle ECU/data bus and a processor configured to calculate a GPS derived slope metric (generally as discussed herein) and a vehicle mass metric (generally as discussed herein, using in part the GPS derived slope data).

Having an accurate mass parameter, determined in real-time during the operation of the vehicle, will enable a more accurate measurement of the work being performed by the vehicle to be measured. The work metric can be used as a driver performance metric on its own, or be combined with other metrics to generate a driver performance metric.

FIG. 8 is a flow chart showing method steps implemented in an exemplary embodiment, where position data (such as GPS data) collected during the operation of a vehicle is used to determine a slope or grade over which the vehicle is being operated. That grade then can be used to calculate other data, such as a weight or mass of the vehicle. In a block 120, three dimensional position data (longitude, latitude and elevation) is collected during vehicle operation. In at least some embodiments, that data is conveyed from the vehicle to a remote computing site (i.e., a monitoring/data storage location) in real-time. In other embodiments, the position data is stored in a memory in the vehicle, to be conveyed to a remote computing site at a later time. In a block 122, the position data is used to determine horizontal ground speed, using the relationship of Equation (1). In a block 124, the horizontal ground speed (from the GPS data) and the Z-axis position data is used to determine the slope or grade, using the relationships of Equations (2) and (3).

In an optional block 126, the slope data is used to calculate a mass of the vehicle, using the relationship of Equation (9). In at least some embodiments, the data processing of blocks 122, 124, and 126 are performed by a remote computing device. However, the concepts disclosed herein encompass embodiments where some or all of the data processing of blocks 122, 124, and 126 are performed by a processor or logic circuit in the vehicle. In at least some embodiments in which the data processing is implemented in the vehicle, the mass parameter is used by an ECU in the vehicle to control operating parameters of the vehicle. For example, vehicle mass can be used as a feedback parameter for controlling vehicle operations, including engine speed (RPM), transmission gear selection, and fuel flow/mixture (to control vehicle emissions). While using vehicle mass data used as a feedback parameter for controlling vehicle operations has been implemented before, those implementations have not used GPS derived slope data as a parameter to determine vehicle mass.

FIG. 9 graphically illustrates force vectors acting on a vehicle, including a frictional force, an aerodynamic force, a grade/slope related force, and a vehicle applied force used to overcome the opposing forces. The forces are discussed above in connection with Equations (4)-(7), and those relationships can be used to use GPS derived slope data to calculate vehicle mass, as shown in Equation (9).

FIG. 10 is a flow chart showing method steps implemented in an exemplary embodiment, where GPS derived slope data and vehicle mass data calculated using GPS derived slope data position data are used to analyze vehicle performance, to determine a cost per loaded mile. Because the concepts disclosed herein provide an improved vehicle mass parameter that is determined while a vehicle is operating, the analysis of the work performed by the vehicle, and the cost per loaded mile calculation, are more accurate than have been heretofore obtainable using data derived by existing techniques. In a block 120, three dimensional position data (longitude, latitude and elevation) is collected during operation of the vehicle. As noted above, in at least some embodiments, that data is conveyed from the vehicle to a remote computing site (i.e., a monitoring/data storage location) in real-time, while in other embodiments, the position data is stored in a memory in the vehicle, to be conveyed to a remote computing site at a later time. In a block 123, fuel use and mileage data is collected during the operation of the vehicle. In a block 126, GPS derived slope data is used to calculate vehicle mass, generally as discussed above. Then, in a block 127, the mileage data, fuel use data, and vehicle mass data are used to slope data is used to calculate a cost per loaded mile metric.

Fleet operators recognize that cost per loaded is a metric that can be analyzed to improve the efficiency of their fleets, by allowing driver performance to be evaluated, and by allowing different routes to be analyzed, to determine the actual cost of servicing a particular route. While these concepts are not new, what is new is the improved vehicle mass metric that can be calculate in real-time while the vehicle is operated, or at a later time, where the mass metric is available for the duration of the vehicle operating segment (or trip). Note that in the prior art, unless the vehicle was weighed during the trip (i.e., before the trip, after the trip, or during the trip at a scale stop) such accurate vehicle mass data was not available, so the cost per loaded metric was error prone, or accurate based on data collected at only a few selected segments of the trip. The concepts disclosed herein are based on collecting vehicle operational data (fuel use, mileage, position data, etc.) frequently (i.e., multiple times a minute, or at least once every few minutes, such intervals being exemplary) so that vehicle mass can be accurately calculated at almost any time during the operation of a vehicle.

An exemplary data set collected from a vehicle will include time indexed position data, engine RPM data, vehicle torque data, and vehicle speed. This data will be collected frequently (multiple times per minute, or a plurality of times over a ten minute period) while the vehicle is operational. Note that vehicle speed can be determined by analyzing position data over time, or can be measured using a vehicle sensor (note that comparing vehicle speed obtained from vehicle sensors with vehicle speed calculated based on GPS data can identify errors in the vehicle speed sensor, which can be caused by incorrect tire sizes, or driver added speed cheating devices designed to override vehicle speed governors). Such a data set can also include other types of vehicle data, including, but not limited to, data relating to the vehicle transmission (so drivers can be evaluated based on percentage of time spent in the most efficient gear), data relating to the vehicle braking system (so drivers can be evaluated based on their braking behavior), data relating to the use of cooling fan overrides (so drivers can be evaluated based on how often they such an override that reduces fuel efficiency), data relating to idle time (so drivers can be evaluated based on percentage of time spent in wasting fuel by idling, noting that idle time can be evaluated in light of position data, so that drivers are not penalized for idling at traffic lights), data relating to the use of a vehicle's cruise control system (so drivers can be evaluated based on percentage of time spent driving at fuel efficient speeds). Note this exemplary data set includes the data required to calculate vehicle mass using GPS derived slope data, generally as discussed above.

FIGS. 11A-11C graphically illustrate histograms that can be derived using the exemplary data set discussed above. These histograms can be used by fleet operators to evaluate the efficiency performance of individual drivers and/or individual vehicles, being operated over specific routes (the routes being defined by the position data). Each Figure has a histogram based on a vehicle being operated with a heavy load, and a histogram based on a vehicle being operated with a light load. In FIG. 11A, speed histograms show a percentage of time a vehicle is operated at specific speeds, enabling fleet operators to determine how often the driver/vehicle is using the most efficient vehicle speeds. The histograms include bars that show load vs. speed, and time vs. speed. In FIG. 11B, RPM histograms show a percentage of time a vehicle is operated at specific RMP settings, enabling fleet operators to determine how often the driver/vehicle is using the most efficient engine speeds. The histograms include bars that show load vs. RPM, and time vs. RPM. In FIG. 11C, load histograms show a percentage of time a vehicle is operated at specific load settings, enabling fleet operators to determine how often the driver/vehicle is placed under the most demanding loads. In exemplary embodiments, when appropriate, the histograms of FIGS. 11A-11C can be generated using the vehicle mass calculated using GPS derived slope data, generally as discussed above.

FIGS. 12A and 12B graphically illustrate histograms that can be derived using the exemplary data set discussed above. These histograms can be used by fleet operators to evaluate the efficiency performance of individual drivers and/or individual vehicles, being operated over specific routes (the routes being defined by the position data). The histogram of FIG. 12A includes bars that show the cost per loaded mile and MPG for 14 different trips (each trip being defined by a different set of position data from the exemplary data set). The histogram of FIG. 12B includes bars that show the cost per loaded mile and MPG for 14 different trips, with the data being normalized to a 30 ton load. In exemplary embodiments, the histograms of FIGS. 12 and 12B are generated using the vehicle mass calculated using GPS derived slope data, generally as discussed above.

Hosted Website for Tracking Driver Performance Data

One aspect of the concepts disclosed herein is a hosted website, enabling drivers and fleet operators to monitor the performance of drivers, based on data collected during the drivers operation of a vehicle. In at least one embodiment, drivers can compare their performance metrics to those of their peers, although the concepts disclosed herein also encompass embodiments where individual drivers can only see their own performance scores. Fleet operators can use these performance metrics as incentives, by linking driver pay with performance.

In general, one or more performance metrics are automatically collected while a driver is operating a vehicle, and that data is used to generate a score or rating of the driver's performance. In at least one embodiment, the score is normalized to enable driver scores from other types of vehicles to be compared. Then, the driver performance data is posted to the hosted website.

In at least one related embodiment, fleet operators will pay drivers using a mileage component (i.e., paying drivers a fixed rate per loaded mile), while also making additional payments to drivers meeting predefined performance characteristics. The hosted website can be used as a forum to enable drivers to track their progress in achieving their pay for performance goals. Fleet operators will have a wide degree of freedom in designing pay for performance goals or campaigns. For example, Fleet A can design a campaign in which only drivers having performance scores in the top 10% of the fleet will earn performance pay. Fleet B can design a campaign in which only the top 25 scoring will earn performance pay during a particular campaign. Fleets can predefine the amount of performance pay each driver can earn. Fleets can also predefine a performance pay pool, such that the share of the pool earned by each driver is a function of the number of drivers meeting predefined performance goals for the campaign.

In at least one embodiment, the performance metric will be a work based performance metric whose calculation involves using vehicle mass determined using GPS derived slope data, generally as discussed above.

It should be recognized that performance campaigns can be metric specific (hard braking performance, idle time performance, such metrics being exemplary and not limiting), or can be based on a single normalized score (cost per loaded mile), but will share in common the characteristic of being implemented for a defined period of time. Drivers will learn to associate such campaigns with opportunities to increase their pay by meeting the performance goals of individual campaigns.

FIG. 13 is a flow chart showing method steps implemented in an exemplary embodiment. In a block 62, the hosted website defines a campaign (noting that the website host may be a fleet operator providing the website for only their drivers, or the hosting website host may be offering the driver performance campaign to drivers from multiple fleets). Parameters of the campaign being defined will likely include a duration of the campaign, the prize or performance pay being offered, the eligible pool drivers, and any rules governing disqualification (such as any safety violation or speeding ticket automatically disqualifying a driver), noting that such parameters are exemplary, and not limiting. The concepts disclosed herein encompass embodiments in which campaigns are fleet specific, such that only drivers from a specific fleet can participate in that campaign (in such an embodiment, the specific fleet is likely funding the prize, although some third party, such as a favored vendor, customer, or advertiser might offer to fund the prize). The concepts disclosed herein encompass embodiments in which campaigns are not fleet specific, such that drivers from multiple fleets can participate in that campaign (in such an embodiment, an advertiser or transportation industry vendor might offer to fund the prize).

In at least one embodiment, the campaign duration is open ended, in that the hosted website will track a drivers' performance data over time, so the driver can use that data to look for other employment opportunities. For example, fleets would likely compete among themselves for drivers having a combination of experience and high performance rankings.

In a block 64, driver performance data is posted to the hosted website. The concepts disclosed herein encompass permutations and combinations of the following: embodiments in which fleet operators can view performance rankings for all of their drivers, but not drivers of other fleets, embodiments in which drivers can only view their own personal performance ranking, embodiments in which drivers can view performance ranking for all of the drivers in their fleet, but not drivers of other fleets, and very transparent embodiments, in which interested parties can visit the website and peruse driver performance rankings with little restrictions.

In a block 66, at the end of the defined campaign, the winning driver (or drivers) are announced and paid a performance pay bonus. Note that the concepts disclosed herein can be extended to other types of incentives, such as vacation time, paid travel, tickets to sporting events, and/or goods and services.

As noted above, in some embodiments, campaign participants are limited to drivers in a specific fleet (i.e., an intra-company or intra-fleet campaign). In such embodiments, that fleet generally will be paying the performance bonuses for the campaign. In other embodiments, campaign participants are not limited to drivers in only one specific fleet (i.e., an inter-company or inter-fleet campaign). In such an embodiment, a third party may be paying the performance bonuses for the campaign. For example, companies providing goods and services to the trucking or vehicle transportation industry may sponsor such a campaign for advertising purposes. A particular fleet operator seeking to attract the attention of drivers in other fleets might also be a sponsor of an inter-company campaign. FIG. 14 is a block diagram indicating that block 62 of FIG. 13 can encompass both intra-company campaigns, as indicated in a block 68, as well as inter-company campaigns, as indicated in a block 70. FIG. 15 is a block diagram indicating that the performance bonus can encompass both intra-company payouts, as indicated in a block 74 (where those bonus funds are used only to pay drivers of a specific fleet), as well as inter-company payouts (where those bonus funds are used to pay any winning driver, regardless of fleet), as indicated in a block 76.

In at least one aspect of the concepts disclosed herein, the performance metric is designed to facilitate comparison of driver performance data across different fleets, and different vehicles. This will enable individual campaigns to include more participating drivers, which in turn will bring in more advertising revenue to fund bigger performance bonuses. In at least one embodiment, such a metric is mutually agreed upon by a plurality of different fleet operators. Adoption of a common performance metric across multiple fleets will enable top performing drivers to be able to show their cumulative performance scores to other participating fleet operators, providing an additional tool for fleets to use when evaluating potential new hires. Such a common performance metric will also enable participating fleet operators to appear more attractive as potential employers than non-participating fleet operators, who will not be offering the drivers the potential of earning the additional performance based income (i.e., income in addition to the industry standard pay by the mile driver compensation).

The concepts disclosed herein encompass embodiments in which individual fleet operators host their own website, where driver rankings in that fleet can be compared. In other embodiments, the website is hosted by a third party, and multiple fleet operators participate. The third party can offset their costs for operating the website by charging participating fleet operators a fee, and/or by advertising revenue. In some embodiments, all driver performance data is displayed in an anonymous format, so that individual drivers cannot be identified unless the driver shares their user ID. In some embodiments, drivers can only compare their score with drivers in their own fleet, while in other embodiments drivers can see the performance data of drivers in other fleets.

FIG. 16 is a functional block diagram of various elements that can be employed to implement the hosted driver performance website concept, in one exemplary embodiment. The elements includes a plurality of enrolled vehicles 148a-148c (noting that the concepts disclosed herein can be applied to a different number of vehicles), a plurality of drivers 152a-152c (noting that the concepts disclosed herein can be applied to a different number of drivers), a plurality of vehicle operators 156a-156c (noting that the concepts disclosed herein can be applied to a different number of vehicle operators), and a remote monitoring service 150. Each vehicle includes the components discussed above in connection with FIG. 3 (noting the number and types of sensors disclosed in FIG. 3 are exemplary, and not limiting), enabling the vehicle to convey performance data from the vehicle to remote monitoring service 50, which monitors the performance data from each vehicle 148a-148c over time to enable the driver's performance while operating that vehicle to be evaluated. In an exemplary embodiment monitoring service 150 generates a webpage (as indicated by webpages 154a-154c) for each vehicle operator, so the vehicle operator can review the performance rankings of each of their drivers. It should be understand that the concepts disclosed herein also encompass other website designs, and the webpage per fleet is not the only possible model. In one embodiment, drivers will have their own webpage 154d (alternatively, drivers can access the webpage for their specific fleet).

It should be understood that monitoring service 150 is implemented using a remote computing device, and that the term remote computing device is intended to encompass networked computers, including servers and clients, in private networks or as part of the Internet. The monitoring of the vehicle/driver performance data and driver performance ranking by monitoring service 150 can be performed by multiple different computing devices, such that performance data is stored by one element in such a network, retrieved for review by another element in the network, and analyzed by yet another element in the network.

FIG. 17 is an exemplary screen shot of a webpage accessed by a driver to review his (or her) performance ranking. It should be understood that the exemplary webpage of FIG. 17 is based on having a webpage upon which drivers for a specific fleet can view their individual scores, as well as the scores of other drivers in their fleet. The concepts disclosed herein specifically encompass embodiments where drivers can view only their own performance rankings, in which case a different webpage design would be employed.

Referring to FIG. 17, a webpage 100 includes a first portion 102 that enables a driver to select a specific driver from among a plurality of drivers. The driver identities can be made anonymous, as shown in FIG. 17 (numbers, not names), or some fleets may wish to list drivers by name (noting that privacy and consent issues for such a scheme are not discussed herein). It should be understood that webpage 100 can be unique to only one driver, such that portion 102 is not required. Using numbers to identify drivers enables individual drivers to look at the scores of their peers, without being able to individually identify which driver obtained what score. The driver will likely only know his or her own unique number, and thus will only be able to personally identify his or her own score. Webpage 100 also includes a results section 104, where details of the selected driver's performance ranking are disclosed. It should be understood that the elements shown on webpage 100 can be displayed on different portions of the webpage, or on different webpages and/or different websites, instead of together. Webpage 100 also includes an ad section 112, where the website host can earn revenue by displaying advertising, and a performance tip section 106, where the website host provides tips to the driver for improving their performance ranking.

Referring to first portion 102, a driver has selected driver number ZONA0047 (noting that any type of driver identification can be employed), such that the data displayed in results section 104 and performance tip section 106 relate to driver ZONA0047. As shown in FIG. 17, results section 104 includes results from three different campaigns, recognizing that in some embodiments drivers will be participating in multiple campaigns (although it should be recognized that the concepts disclosed herein encompass embodiments where drivers participate a greater number of campaigns, or fewer campaigns, including only a single campaign (noting the duration of the single campaign could span the driver's career).

Referring to results section 104, exemplary (but not limiting) information displayed herein includes details on the campaign, whether the campaign is inter-company or intra-company, and the driver's performance ranking for that campaign. A visual guide to the driver's relative performance is displayed using a plurality of fuel pump icons (where a greater number of fuel pump icons, or other graphical icons, indicates a better performance rating). As shown, webpage 100 is based on displaying 10 fuel pump icons for each campaign (icons 108a-108c), enabling the driver's performance to be graphically displayed on a scale of 1 to 10. Thus, a driver whose performance ranking is in the top $80^{th}$ percentile would have 8 solid or un-shadowed fuel pumps. Recognizing that while only full icons are displayed in this example, partial fuel pump icons can be used as well, to provide fractional ratings, or numbers between 0 and 10 can be rounded up to the next whole number. Radio buttons 110a-c can be used by the driver to select performance tips for the particular campaign to be displayed in section 106.

With respect to webpage 100, it should be understood that the design of webpage 100 is intended to be exemplary, and different webpage designs can be employed; and further, that the data on webpage 100 can be provided to the vehicle operator on more than one webpage. If desired, access to webpage 100 can be restricted only to the fleet operator employer the driver and the driver themself. However, providing other drivers access to webpage 100 will enable drivers to see how they rank compared to their peers, encouraging drivers to compete amongst themselves to collect the performance bonus available in campaigns.

Referring once again to section 104 of webpage 100, note that a first campaign (associated with radio button 110a) is identified as INTRA-COMPANY RANKING. This campaign is a fleet sponsored campaign for all of the fleet drivers to compete with each other for a performance bonus. Driver ZONA0047 ranks as $83^{rd}$ out of 225 drivers, with lower numbers indicating better performance (i.e., the top ranking driver would be ranked as 1, noting that the fleet operator could have reversed the logic, such that 225 was the top ranking driver). Being the $83^{rd}$ lowest ranking driver out of a fleet of 225 drivers places driver ZONA0047 in the top 63% ((225−83)/(225*100)=63.11%). Six fuel pump icons 108a are filled in. The campaign parameters are summarized, indicating that drivers having rankings from 1-25 (i.e., the top 88.89%) across the entire fleet share in the bonus pool assigned to this campaign. Driver ZONA0047 needs to increase his ranking from $83^{rd}$ to $25^{th}$ in order to be eligible for a share in the bonus pool. Note that campaigns can be configured such that the top 25 drivers earn equal shares of the bonus pool, and campaigns can also be configured such that higher ranking drivers (i.e., closer to #1) earn a proportionally larger share of the bonus pool.

Referring once again to section 104 of webpage 100, note that a second campaign (associated with radio button 110b) is identified as INTRA-COMPANY CAMPAIGN XYZ. This campaign is a fleet sponsored campaign for all of the fleet drivers to compete with each other for a performance bonus. Driver ZONA0047 has no ranking indicated in the campaign, thus all ten fuel pump icons 108b are shadowed or empty. The campaign parameters are summarized, indicating that Campaign XYZ includes a bonus pool to be shared by the 10 fleet drivers having the most improved performance scores for December 2011. Driver ZONA0047 has selected radio button 110b so that performance tips and additional information related to Campaign XYZ are displayed in section 106. Those performance tips include a first tip indicating that late shifting reduced Driver ZONA0047's performance ranking by 9.2% over the last 14 days. A second performance tip indicates that hard breaking events reduced Driver ZONA0047's performance ranking by 5.3% over the last 19 days. Finally, the last performance tip indicates that excessive idling on Dec. 11, 2011 disqualified Driver ZONA0047 from Campaign XYZ. It should be recognized that the specific performance tips shown in section 106 are intended to be exemplary, and not limiting. The actual performance tips displayed will be related to the specific campaign, and designed to provide feedback to individual driver's to enable them to identify behaviors that have reduced their performance ranking.

In some embodiments section 112 includes banner ads targeted to drivers. In other embodiments section 112 includes advertising from vendors who are sponsoring specific campaigns, or who are sponsoring hosting of the driver performance ranking website. The advertising can be a mixture of those different types, and other types of advertising.

Exemplary System Environment

FIG. 18 is a functional block diagram of an exemplary system employed to implement some of the concepts disclosed herein. The functional block diagram illustrates exemplary components used in each vehicle 128 that is enrolled in a vehicle/driver performance monitoring service, to implement some of the method steps discussed above. An exemplary vehicle/driver performance monitoring service is based on adding an optional data buffer 136 (or other short-term memory storage) and a bi-directional data link 134 to each enrolled vehicle (in an exemplary, but not limiting embodiment, the data buffer and data link are combined into a single component). It should be understood that the short term memory storage is not required for embodiments where the performance data transmitted from the enrolled vehicle does not include operational, vehicle, or driver related data that must be briefly stored. In an exemplary embodiment, the data link is a combination radio frequency (RF) transmitter and receiver, although separate transmitters and receivers could be used (note the term RF specifically encompasses cellular telephone based data links). A data terminal can optionally be included in the vehicle to facilitate operator entry of information and operator transmission of information that is presented to the operator on a display within the vehicle. Data collected on a portable data collection device during an inspection can also be uploaded through such a data terminal, or independently by direct transmission to the remote monitoring service. While RF data transmission represents an exemplary embodiment, other types of data transmission could be employed. If the vehicle does not already include performance data/operational data collecting components 130, such components are added. Most vehicles manufactured today include operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 132 that performs the function of managing the transmission of performance data from the vehicle to the remote monitoring service, according to one or more of the transmission paradigms discussed herein. In embodiments where the performance data includes temporary storage of operational data, the processor also implements the function of temporarily storing operational data from components 130 in data buffer 136 or other temporary storage, and using bi-directional data link 134 to convey real-time performance data and/or the buffered operational/performance data from the enrolled vehicle to a remote computing device 140 (which is used to analyze the performance of the vehicle and/or driver). It should be understood that those processor functions can be implemented by a single processor, or distributed across multiple processors.

In some embodiments, an output 138 is also included, to provide information to the driver in a form that can be easily understood by the driver. Output 138 can be implemented using a speaker providing an audible output, and using a display providing a visual output. Note that output 138 can be combined into a single component with the data buffer and the data link, so only a single additional component is added to the vehicle (recognizing that most vehicles already include the additional required components, such as the operational data collecting components and the processor).

While not specifically shown in FIG. 18, in particularly preferred embodiments the vehicle is equipped with a GPS unit (exemplary GPS units are illustrated in FIGS. 6 and 20). In a related preferred embodiment the processor, the GPS component, any buffer, and data link are combined into a single telematics device. Such a device will send GPS and vehicle/driver performance data to the remote computing device discussed below at a plurality of different times during the course of the operation of the vehicle. In general, the telematics device will transmit data at intervals ranging from as frequently as every 5 to 15 seconds, or as rarely as every 5 minutes, recognizing that such intervals can vary, and are intended to be exemplary, and not limiting.

As indicated in FIG. 18, remote computing device 140 (operated by the monitoring service) is logically coupled via a network 142 (such as the Internet) to a computing device 144 (such as a personal computer, a tablet, or a smart phone) accessible to a driver (in embodiments where driver performance rankings are shared with drivers, noting only one such driver device is shown in the Figure; however, the monitoring service will likely be monitoring the performance of a plurality of drivers, each likely having access to a different computing device 144), and a computing device 146 accessible to a vehicle operator (noting that in at least some embodiments, the monitoring service performs the monitoring function for a plurality of different vehicle operators/fleets). Network 142 facilitates communication between computing devices 140, 144, and 146, enabling the monitoring service to efficiently communicate with drivers and vehicle operators. It should be noted that the concepts disclosed herein encompass embodiments where the monitoring service and vehicle operator are the same entity.

The concepts disclosed herein are in at least some embodiments intended to be used by fleet owners operating multiple vehicles, and the performance data conveyed to the remote location for diagnosis will include an ID component that enables each enrolled vehicle to be uniquely identified.

Exemplary Computing Environment

FIG. 19 is a functional block diagram of an exemplary computing device that can be employed to implement some of the method steps disclosed herein. It should be understood that the concepts disclosed herein encompass processing of data collected at a vehicle both in the vehicle and at a remote computing device.

FIG. 19 schematically illustrates an exemplary computing system 250 suitable for use in implementing the processing functions disclosed herein. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of performance data (and in some embodiments, of position data) collected from enrolled vehicles, to identify mechanical faults in the enrolled vehicles. The machine instructions implement functions generally consistent with those described above. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle performance data over time to detect a mechanical fault). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. In embodiments where computing system 250 is implemented in a vehicle, the computing system 250 can be configured to run autonomously, such that a user input device not regularly employed.

Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. In embodiments where computing system 250 is implemented in a vehicle, the computing system 250 can be vehicle performance data (and position data when desired) collected in connection with operation of enrolled vehicles to configured to run autonomously, such that a user output device not regularly employed.

Data link 264 is configured to enable data to be input into computing system 250 for processing. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

Note that vehicle/driver performance data from the enrolled vehicles will be communicated wirelessly in at least some embodiments, either directly to the remote computing system that analyzes the data to evaluate the driver's performance, or to some storage location or other computing system that is linked to computing system 250.

It should be understood that the terms "remote computer", "computing device", and "remote computing device" are intended to encompass a single computer as well as networked computers, including servers and clients, in private networks or as part of the Internet. The vehicle/driver performance data received by the monitoring service from the vehicle can be stored by one element in such a network, retrieved for review by another element in the network, and analyzed by yet another element in the network. While implementation of the methods noted above have been discussed in terms of execution of machine instructions by a processor (i.e., the computing device implementing machine instructions to implement the specific functions noted above), the methods could also be implemented using a custom circuit (such as an application specific integrated circuit or ASIC).

The concepts disclosed herein encompass collecting data from a vehicle during operation of the vehicle. The data collected is used to analyze the performance of at least one of the driver and the vehicle. In preferred embodiments, the data is collected during operation of the vehicle and wirelessly transmitted from the vehicle during its operation to a remote computing device using a cellular phone network based data link. The frequency of such data transmissions can be varied significantly. In general, more data is better, but data transmission is not free, so there is a tension between cost and performance that is subject to variation based on an end user's needs and desires (some users will be willing to pay for more data, while other users will want to minimize data costs by limiting the quantity of data being transferred, even if that results in a somewhat lower quality data set). The artisan of skill will be able to readily determine a degree to which data quality can be reduced while still provide useful data set.

Exemplary GPS Device with Onboard Computing Environment

FIG. 20 is a functional block diagram of an exemplary telematics device added to an enrolled vehicle to implement one or more of the methods of FIGS. 1, 2, 7, 8 and 10.

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. The exemplary data set discussed above in connection with calculated loaded cost per mile can also be employed. These data transmission can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164. If desired, additional memory can be included to temporarily store data id the RF component cannot transfer data. In particularly preferred embodiments the RF components is GSM or cellular technology based.

In at least one embodiment, the controller is configured to implement the method of FIG. 1 by using one or more of data collected from GPS 170 and data from input 168. In a related embodiment, the controller is configured to implement the method of FIG. 2 by using one or more of data collected from GPS 170 and data from input 168. In yet another related embodiment, the controller is configured to implement steps of the method of FIG. 7.

In another embodiment, the controller is configured to implement steps of the method of FIG. 8. Once the vehicle mass has been determined, that data can be added to GPS data that is transmitted to a remote computing device. In a related embodiment, input 168 is bi-directional, and the vehicle mass is output from the telematics device onto a vehicle data bus, and can be used by an ECU to control vehicle operations. ECUs have been developed to use estimates of vehicle mass to control engine speed and transmission shifting, however, those estimates of vehicle mass have not been based on GPS derived slope data, and as such those prior art vehicle mass estimations have been less accurate than the vehicle mass calculations based on GPS derived slope data as disclosed herein.

In addition to using GPS or position data to derive slope, it should be noted that if the vehicle is equipped with a multi-axis accelerometer (such as a 3-D accelerometer), that the data from the accelerometer can be used in place of the position data to calculate slope. Essentially, the position data over time provides vectors, and the accelerometer data provides similar vectors. The vectors from the 3-D accelerometer can be used in place of the GPS derived vectors in Equations 1-3 discussed above. Once slope has been determined using the 3-D accelerometer data, mass can be derived using the relationships discussed above. Performance metrics can be similarly determined, generally as described above, using slope derived from 3-D accelerometer data.

Where a vehicle is equipped both with a 3-D accelerometer and a position tracking component (such as a GPS receiver), input from both sources can be used to calculate velocity in three components (X, Y, Z or N/S, E/W, and Up/Down). Using data from two input sources may increase the accuracy of the slope thus derived using Equations 1-3. If it is determined that data from the 3-D accelerometer is generally more accurate than data from the GPS component (or other position tracking component), or vice versa, then the input data from the relatively more accurate source can be afforded more weight when being used to calculate the three required velocity components (X, Y, Z or N/S, E/W, and Up/Down). In at least one embodiment encompassed by the concepts disclosed herein, a GPS receiver at the vehicle incorporates a 3-D accelerometer, so both inputs (GPS and 3-D accelerometer) are available to a processor for the calculation of the slope.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method of using vehicle position data in a vehicle having an engine control unit (ECU), comprising the step of:
    (a) while the driver is operating the vehicle, automatically collecting vehicle data, the vehicle data including vehicle position data in the x, y and z axes; and
    (b) using a first computing device to iteratively evaluate a first parameter of interest from changes in the z axis position data over time, thereby producing a first sequence of values; and (c) using said first sequence of values to compute a second parameter of interest that is provided to the ECU and is used by the ECU to control vehicle operations.

2. The method of claim 1, wherein the first sequence of values is road surface slope.

3. The method of claim 2, wherein the step of using the first computing device to derive a sequence of values of road surface slope using vehicle position data comprises the steps of:
   (a) using the vehicle position data to determine horizontal ground speed; and
   (b) using the horizontal ground speed and an up directional vector from the vehicle position data to determine the road surface slope metric.

4. The method of claim 2, wherein engine RPM data is used as one parameter in a calculation of vehicle applied force, which, together with the road surface slope, is used to calculate vehicle weight as the second parameter of interest.

5. The method of claim 2, wherein engine output torque data is used as one parameter in a calculation of vehicle applied force, which, together with the road surface slope, is used to calculate vehicle weigh as the second parameter of interest.

6. The method of claim 2, wherein vehicle velocity is used as one parameter in a calculation of vehicle applied force, which, together with the road surface slope, is used to calculate vehicle weight as the second parameter of interest.

7. The method of claim 1, wherein the second parameter of interest is vehicle weight.

8. The method of claim 7, further comprising using a third computing device to evaluate a metric of interest using the second parameter of interest.

9. The method of claim 8, wherein the metric of interest is a driver performance metric.

10. The method of claim 8, wherein the step of using the third computing device to determine a metric of interest comprises the step of using a computing device disposed at the vehicle.

11. The method of claim 10, wherein the first and third computing devices are the same computing device.

12. The method of claim 10, wherein the first, second, and third computing devices are the same computing device.

13. The method of claim 1, wherein the step of automatically collecting vehicle position data comprises the step of automatically collecting global position system (GPS) data.

14. The method of claim 1, wherein the step of using the first computing device to iteratively evaluate a first parameter of interest from changes in the z axis data over time comprises the step of using a computing device disposed at the vehicle.

15. The method of claim 1, further comprising the step of wirelessly transmitting data from the vehicle to the first computing device, the first computing device being disposed remote from the vehicle.

16. The method of claim 1, further comprising the step of wirelessly transmitting data from the vehicle to a second computing device, the second computing device being disposed remote from the vehicle.

17. The method of claim 1, wherein the second parameter of interest is vehicle weight and the ECU uses vehicle weight to control engine speed.

18. The method of claim 1, wherein the second parameter of interest is vehicle weight and the ECU uses vehicle weight to control transmission shifting points.

19. The method of claim 1, wherein the second parameter of interest is vehicle weight and the ECU uses vehicle weight to inform emissions controls.

* * * * *